US008980962B2

(12) United States Patent
Theivendran et al.

(10) Patent No.: US 8,980,962 B2
(45) Date of Patent: Mar. 17, 2015

(54) METHODS OF PRODUCING IODINATED RESINS

(71) Applicant: Water Security Corporation, Sparks, NV (US)

(72) Inventors: Sivarooban Theivendran, Reno, NV (US); Terryll Riley Smith, Reno, NV (US); Marian Pettibone, Reno, NV (US)

(73) Assignee: Water Security Corporation, Sparks, NV (US)

( * ) Notice: Subject to any disclaimer, the term of this patent is extended or adjusted under 35 U.S.C. 154(b) by 108 days.

(21) Appl. No.: 13/760,570

(22) Filed: Feb. 6, 2013

(65) Prior Publication Data

US 2014/0217037 A1 Aug. 7, 2014

(51) Int. Cl.
*C02F 1/50* (2006.01)
*C02F 1/42* (2006.01)
*B01J 41/12* (2006.01)
*B01J 49/00* (2006.01)

(52) U.S. Cl.
CPC ........................................ *C02F 1/50* (2013.01)
USPC ................... 521/27; 521/26; 521/30; 521/71; 210/670; 210/269

(58) Field of Classification Search
CPC ............. B01J 41/12; B01J 49/00; C02F 1/42; C02F 1/50
USPC ................... 521/27, 26, 30, 71; 210/670, 269
See application file for complete search history.

(56) References Cited

U.S. PATENT DOCUMENTS

| 3,817,860 | A |   | 6/1974 | Lambert et al. |
| 4,131,645 | A | * | 12/1978 | Keblys et al. ................. 423/501 |
| 4,187,183 | A |   | 2/1980 | Hatch |
| 4,190,529 | A |   | 2/1980 | Hatch |
| 4,238,477 | A |   | 12/1980 | Lambert et al. |
| 4,420,590 | A |   | 12/1983 | Gartner |
| 4,999,190 | A |   | 3/1991 | Fina et al. |
| 5,176,836 | A |   | 1/1993 | Sauer et al. |
| 5,314,968 | A |   | 5/1994 | Frommer et al. |
| 5,624,567 | A |   | 4/1997 | Colombo |
| 6,506,737 | B1 |   | 1/2003 | Hei et al. |
| 6,592,861 | B2 |   | 7/2003 | Messier |
| 2003/0138395 | A1 | * | 7/2003 | Messier ....................... 424/78.1 |
| 2011/0226706 | A1 |   | 9/2011 | Theivendran et al. |
| 2012/0199540 | A1 |   | 8/2012 | Theivendran et al. |
| 2013/0200008 | A1 |   | 8/2013 | Theivendran et al. |

OTHER PUBLICATIONS

J. L. Lambert, et al., "Preparation and Properties of Triiodide-, Pentaiodide-, and Heptaiodide-Quaternary Ammonium Strong Base Anion-Exchange Resin Disinfectants," *Ind. Eng. Chem. Prod. Res. Dev.* 1980, 19, 256-258.

G. L. Hatch et al., "Some Properties of the Quaternary Ammonium Anion-Exchange Resin-Triiodide Disinfectant for Water," *Ind. Eng. Chem. Prod. Res. Dev.* 1980, 19, 259-263.

I. Samemasa et al., "Uptake of Iodine and Bromine by Ion-Exchange Resins in Aqueous Solution," *Analytical Sciences*, 2008, 24, 921-924.

J. L. Lambert, et al., "Iodide and Iodine Determination in the Parts-per-Billion Range with Leuco Crystal Violet and N-Chlorosuccinimide-Succinimide Reagents," Analytical Chemistry, 1975, 47, 915-916.

G. L. Hatch, "Preparation of Iodinated Anion-Exchange Resins for the Controlled Release of Disinfecting Levels of Iodine and Hypoiodous Acid," *Ind. Eng. Chem. Prod. Res. Dev.* 1981, 20, 382-385.

J. E. Atwater et al., "Regenerable Microbial Check Valve: Life Cycle Tests Results," SAE Technical Paper Series, paper 921316, presented at the $22^{nd}$ International Conference on Environmental Systems, Jul. 13-16, 1992.

U.S. Army Public Health Command, "Iodine Disinfection in the Use of Individual Water Purification Devices," Technical Information Paper #-31-005-0211, Dated Mar. 2006, updated Jan. 2011.

4500-I Iodine in *Standard Methods for the Examination of Water and Wastewater*, A. D. Eaton et al., ed., 2005, pp. 4-70 to 4-71 and 4-97 to 4-99.

W. Gottardi, Chapter 8, "Iodine and Iodine Compounds" in Disinfection, Sterilization, and Preservation, $5^{th}$ ed. S.S. Block ed., Lippincott Williams & Wilkins, 2001, pp. 159-183.

U.S. Appl. No. 13/466,801 to Theivendran et al. entitled "Methods of Producing Iodinated Anion Exchange Resins", filed May 8, 2012.

International Search Report for PCT/US2013/24975, mailed Apr. 8, 2013.

4500-Cl G. DPD Colorimetric Method in *Standard Methods for the Examination of Water and Wastewater*, A. D. Eaton et al., ed., 2005, pp. 4-67 to 4-68.

* cited by examiner

*Primary Examiner* — Michael M Bernshteyn
(74) *Attorney, Agent, or Firm* — K&L Gates LLP

(57) ABSTRACT

Methods for producing or regenerating an iodinated resin are presented. The methods include converting iodide residues on a surface of and in pores of an iodide loaded anion exchange resin to iodine and iodine intermediates using a source of active halogen to form an iodinated resin having iodine and iodine intermediate residues on the surface of and in the pores of the iodinated resin. The iodinated resins show reduced and stable levels of iodine elution compared to conventional iodinated anion exchange resins and may utilizes less iodine raw materials during the manufacturing process. The iodinated resin can also act as an end-of life indicator in a water purification system that incorporates the iodinated resin to reduce microbial, including bacterial and viral, contamination in drinking water sources. Methods and systems for purifying water are also presented.

23 Claims, 10 Drawing Sheets

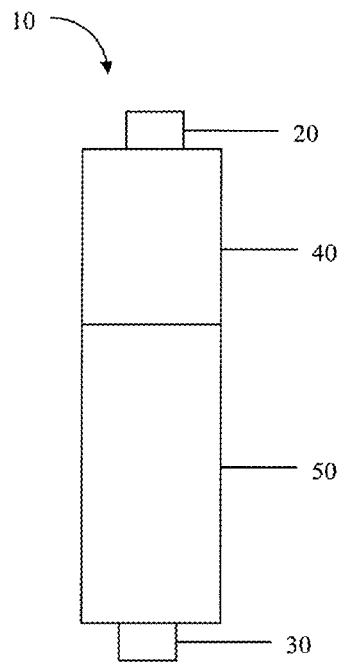

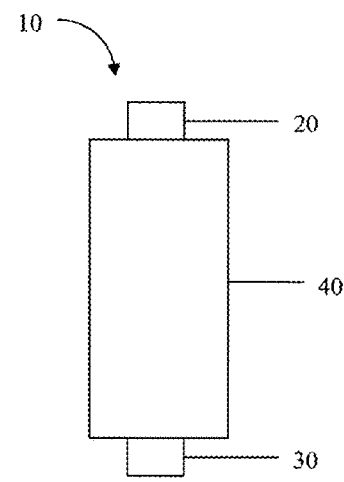

FIG. 9

| Preparing an iodinated resin by treating an iodide loaded anion exchange resin with a source of active halogen in aqueous solution, followed by loading further iodine onto remaining iodide ions using a solution of soluble aqueous iodine |
|---|

↓

| Positioning a iodinated resin intermediate an inlet and an outlet |
|---|

↓

| Positioning a chitosan-based material and/or a scavenger barrier intermediate the iodinated resin and the outlet |
|---|

FIG. 10A
FIG. 10B
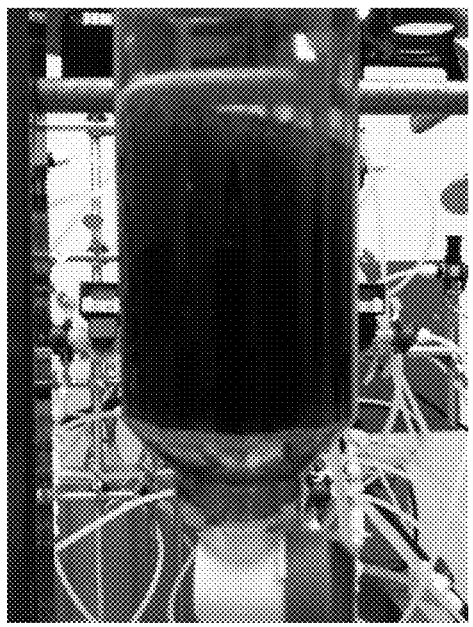
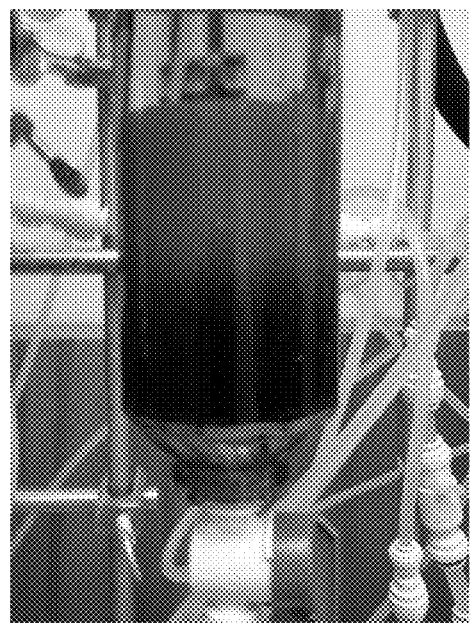

METHODS OF PRODUCING IODINATED RESINS

FIELD OF TECHNOLOGY

The present disclosure relates to methods for producing iodinated resins. The resins may be incorporated into water treatment systems.

BACKGROUND

Over one billion people lack access to reliable and sufficient quantities of safe or potable drinking water. Waterborne contaminants pose a critical health risk to the general public, including vulnerable populations, such as children, the elderly, and those afflicted with disease, if not removed from drinking water. An estimated six million people die each year, half of which are children under 5 years of age, from contaminated drinking water. The U.S. Environmental Protection Agency Science Advisory Board considers contaminated drinking water one of the public's greatest health risks.

Many people rely on groundwater as their only source of water. Groundwater was believed to be relatively pure due to its percolation through the topsoil; however, research has shown that up to 50% of the active groundwater sites in the United States test positive for waterborne contaminants. Waterborne contaminants may include microorganisms, including viruses, such as enteroviruses, rotaviruses and other reoviruses, adenoviruses Norwalk-type agents, other microbes including fungi, bacteria, flagellates, amoebae, Cryptosporidium, Giardia, other protozoa, prions, proteins and nucleic acids, pesticides and other agrochemicals, including organic chemicals, inorganic chemicals, halogenated organic chemicals and other debris. Accordingly, the removal of waterborne contaminants may be necessary to provide potable drinking water for the general public; water for emergency use during natural disasters and terrorist attacks; water for recreational use, such as hiking and camping; and water for environments in which water must be recirculated, such as aircraft and spacecraft.

Iodinated anion exchange resins have been shown to effectively reduce viral or bacterial contaminants in treated water. However, conventional iodinated anionic exchange resins may display very high initial iodine ($I_2$) elution (compared to the iodine levels necessary to achieve effective elimination of microbial pathogens) and/or water temperature and/or pH dependent activity. This leads to premature iodine elution from iodine scavenging anion exchange resins downstream from the iodinated anion exchange resin, as well as high iodine loading in the scavenging resins. In addition, the high initial iodine elution can lead to reduced iodine levels over extended usage and concomitant reduced microbiological performance. Further, commercial iodinated anion exchange resins can be expensive, at least in part due to higher iodine loading, the economic expense from high iodine prices and longer production processing times. Therefore, improved resins and methods for forming the resins which utilize lower iodine concentrations during manufacturing and display lower iodine leaching, particularly in the initial effluent, would be desirable.

BRIEF DESCRIPTION

Various embodiments of the present disclosure relate to methods for producing iodinated resins and methods and systems for water purification.

A first embodiment of the present disclosure provides a method for producing an iodinated resin. The method comprises converting iodide ions on a surface of or in pores of an iodide loaded anion exchange resin to iodine and iodine intermediate residues by oxidizing the iodide ions on a surface of or in pores of the iodide loaded anion exchange resin with a source of active halogen at a pH of less than about 7.0 to form an iodinated resin having iodine and iodine intermediate residues on the surface of and in pores of the resin In various embodiments, sources of active halogen may include sources of active chlorine selected from the group consisting of chlorine gas, trichloroisocyanuric acid ("TCCA"), sodium dichloroisocyanuriate, sodium hypochlorite, calcium hypochlorite, hypochlorous acid, and combinations of any thereof. In certain embodiments, the method can further comprise loading the iodinated resin with further iodine using a source of soluble iodine.

Other embodiments of the present disclosure provide methods for producing an iodinated resin comprising treating a chloride form anion exchange resin with an aqueous solution of a soluble iodide salt to form the iodide loaded anion exchange resin, oxidizing the iodide ions on a surface of or in pores of the iodide loaded anion exchange resin with a source of active chlorine at a pH value of less than about 7.0 to form an iodinated resin having iodine and iodine intermediate residues on the surface of and in pores of the iodinated resin, and loading the iodinated resin further with iodine using a source of soluble $I_2$.

Still further embodiments of the present disclosure provide methods for treating water comprising eluting water having at least one viral, bacterial, or microbial contaminant through an iodinated resin prepared by oxidizing iodide ions on a surface of or in pores of an iodide loaded anion exchange resin with a source of active halogen at a pH value of less than about 7.0 to form the iodinated resin having iodine and iodine intermediate residues on the surface of and in pores of the iodinated resin.

Additional embodiments of the present disclosure provide a water treatment system comprising at least one column or compartment comprising an iodinated resin and configured to elute water through the at least one column or compartment, wherein the iodinated resin is prepared by oxidizing iodide ions on a surface of or in pores of an iodide loaded anion exchange resin with a source of active halogen at a pH value of less than about 7.0 to form the iodinated resin having iodine and iodine intermediate residues on the surface of and in pores of the iodinated resin.

DESCRIPTION OF THE DRAWINGS

The various embodiments described herein may be better understood by considering the following description in conjunction with the accompanying drawings, wherein:

FIGS. 8A, 8B and 8C illustrate several embodiments of the water treatment system described herein;

FIG. 9 illustrates one embodiment of a method for manufacturing a water treatment system as described herein; and FIG. 10A illustrates the color of a conventional MCV® iodinated anion exchange resin after 5000 L aging at 41° C. FIG. 10B illustrates the end-of-life indicator feature of the iodinated resins of the present disclosure after 5000 L aging at 41° C.

DETAILED DESCRIPTION

Figure 1:
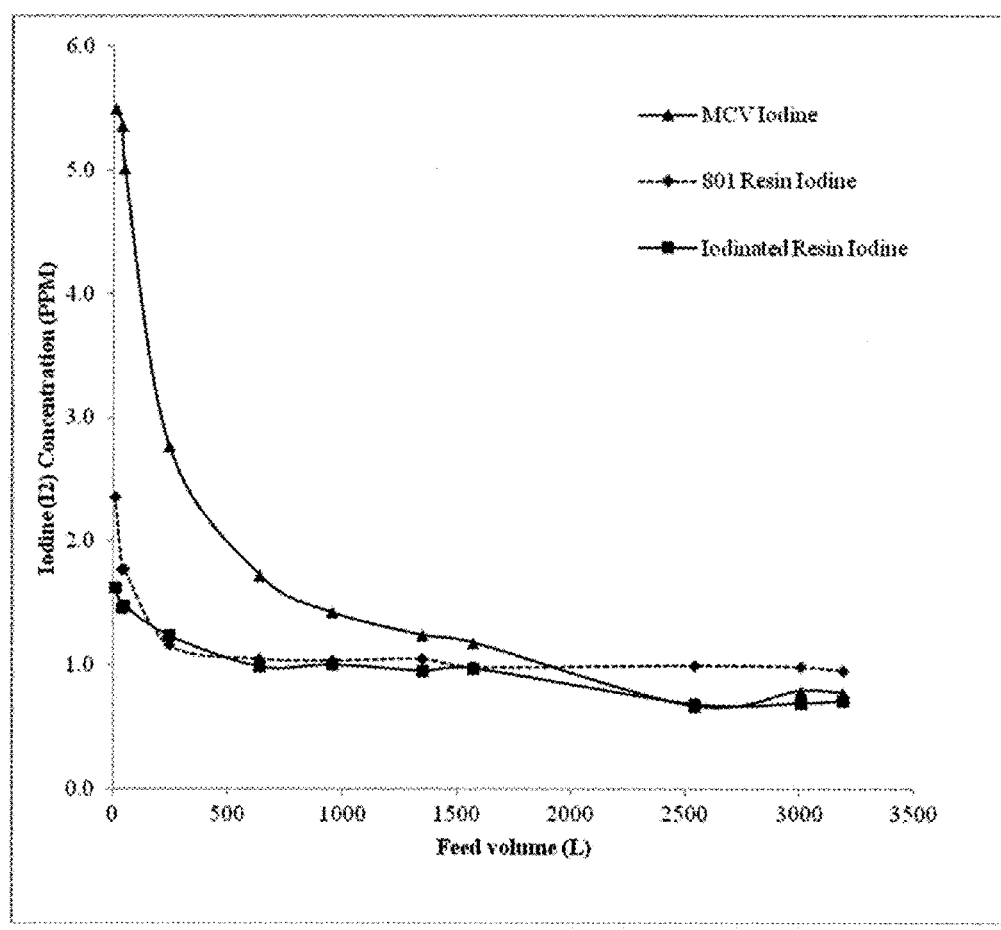
FIG. 1 illustrates the room temperature iodine elution profiles of conventional iodinated anion exchange resins and the iodinated resin according to the present disclosure.

Embodiments of the present disclosure provide for methods of producing iodinated resins. The iodinated resins may display reduced iodine elution and superior lifetime compared to conventional iodinated anion exchange resins. The iodinated resins of the present disclosure may also act as water treatment device life indicators. In certain embodiments, the described methods may also be used to regenerate a used iodinated resin. The iodinated resins may be used to treat water to remove biological contaminants, such as viral, bacterial, microbial, and/or fungal contaminants. According to various embodiments, the resulting iodinated resins display a shallow iodine and/or iodide elution profiles during the performance of the resin, while requiring lower amounts of iodine containing raw materials to produce the active resin and provide similar kill rates to conventional iodinated anion exchange resins.

As generally used herein, the terms "include" and "have" mean "comprising".

As generally used herein, the term "about" refers to an acceptable degree of error for the quantity measured, given the nature or precision of the measurements. Typical exemplary degrees of error may be within 20%, 10%, or 5% of a given value or range of values. Alternatively, and particularly in biological systems, the term "about" may mean values within an order of magnitude, potentially within 5-fold or 2-fold, of a given value.

All numerical quantities stated herein are approximate unless stated otherwise, meaning that the term "about" may be inferred when not expressly stated. The numerical quantities disclosed herein are to be understood as not being strictly limited to the exact numerical values recited. Instead, unless stated otherwise, each numerical value is intended to mean both the recited value and a functionally equivalent range surrounding that value. At the very least, and not as an attempt to limit the application of the doctrine of equivalents to the scope of the claims, each numerical parameter should at least be construed in light of the number of reported significant digits and by applying ordinary rounding techniques. Notwithstanding the approximations of numerical quantities stated herein, the numerical quantities described in specific examples of actual measured values are reported as precisely as possible.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

As used herein, the term "active halogen" refers to compounds having active forms of an element of the group 17 column of the periodic table (i.e., F, Cl, Br, and I), for example active halogen includes compounds having a molecular formula of $X_2$, where X is one of F, Cl, Br, or I, compounds, or having a formula, such as HOI, $I_3^-$, $OI^-$, $OBr^-$, or $OCl^-$. Examples of active halogens include, but not limited to, $Cl_2$ and $Br_2$. Halogen ($X_2$) producing compounds include compounds that release a halogen into aqueous systems. Active halogen, as used herein, corresponds to a active species consisting of a single type of halogen (i.e., only I, only Cl, or only Br). As used herein, the term "iodine" means molecular iodine with a formula $I_2$. As used herein, the term "halide" refers to the anionic form of a halogen atom, represented as $X^-$. Examples of halide ions include chloride ($Cl^-$), bromide ($Br^-$) or iodide ($I^-$).

As used herein, the term "anion exchange resin" refers to a polymeric resin having an insoluble matrix or support structure, normally in the form of beads, particles, particulates, or powder, fabricated from an organic polymer structure. The polymeric structure has active cationic sites incorporated into the structure. Anions can reversibly bind to these active sites. Suitable active cationic sites include chloride form strong base ion exchange resins, such as quaternary trialkylammonium sites ($—NR_3^+$), dialkylammonium sites ($—NHR_2^-$), alkylammonium sites ($—NH_2R^+$), and ammonium sites ($—NH_3^+$) as well as other cationic active sites. There are other types of quaternary ammonium resins with different and unique functional groups, but the primary commercially available resins are the strong base, quaternary ammonium resins using DVB as the crosslinking agent. Certain suitable resins of these are the "type I" (trimethylammonium) and "type II" (dimethylethanol ammonium) functional groups. Other available suitable anion exchange resins may include, but are not limited to, chemically analogous or similar 'strong base' resins with a positively charged functional site such as tertiary sulfonium, quaternary phosphonium and alkyl pyridinium containing anion exchange resins. One of skill in the art would understand that other strong base anion exchange resins currently available or developed in the future could be readily substituted for the resins described herein without departing from the scope and intent of the present disclosure.

As used herein, the term "iodinated resin" includes a resin, such as an anion exchange resin, comprising at least one of iodine ($I_2$) and iodine intermediate residues (such as HOI) on the surface of the resin material and/or in the pores of the resin material. It is believed that the majority of the iodine residues and iodine intermediate residues of the iodinated resins are not associated with an anionic iodide residue on a cationic site of the resin, such as in the form of a polyiodide residue, i.e., $I_3^-$, $I_5^-$, $I_7^-$, etc., unlike a conventional iodinated ion exchange resin. In addition to the iodine residues and iodine intermediate residues on the surface of and in the pores of the resin, iodinated resins may also comprise a limited number of polyiodide residues on cationic sites of the resin material. It is expected that the resin performance does not rely on an anion exchange mechanism to release iodine or iodine intermediates for disinfection purposes. The iodinated resin described herein is designed to release all or substantially all loaded iodine species during operation.

As used herein, the term "soluble iodide salt" means an ionic salt comprising at least one iodide ($I^-$) ion and at least one suitable countercation, such that the soluble iodide salt sufficiently dissociates in aqueous solution to form an aqueous solution of the salt. Suitable countercations include alkali metal cations, alkaline earth metal cations, transition metal cations, and metal cations or metalloid cations in the 13, 14, and 15 column of the Periodic Table of Elements.

As used herein, the term "iodine intermediate residues" means oxidized iodine containing disinfecting intermediate residues, for example, hypoiodous acid (HOI) and hypoiodite ion (OI$^-$, when pH of aqueous solution is 8 or higher), that can produce iodine or react with and eliminate microbial contaminants. For example, in aqueous solutions, iodine may be in equilibrium with hypoiodous acid where the shift of the equilibrium depends on the pH of the solution. Further, at pH conditions at which the iodinated resin is prepared and generally used (i.e., prepared at lower pH and operated generally around neutral pH), it is believed that the iodinated resin iodine intermediate residues are generally in the form of $I_2$ and HOI.

As used herein, the term "in situ" means that molecular iodine ($I_2$) and iodine intermediate residues, such as HOI, is formed by a chemical reaction on or inside the resin structure, rather than, for example, by a physical dissolution process where iodine is dissolved into the solution. For example, according to certain embodiments, iodine and iodine intermediate residues may be formed in situ on the surface of and in the pores of a resin material. In contrast, dissolved iodine may not be capable of forming on the surface of and in the pores of a resin material due to sterics and electronic effects.

As used herein, the term "iodide loaded anion exchange resin" means an anion exchange resin in which the active sites substantially comprise iodide (I$^-$) ions, for example, at least 70%, at least 80%, at least 90%, or even at least 95% of the active sites comprise I$^-$ ions. Iodide loaded anion exchange resins may be produced, for example, by treating a commercially available chloride loaded strong base ion exchange resin with an aqueous solution of a soluble iodide salt.

As used herein, the term "iodinated anion exchange resin" means an anion exchange resin having predominantly short chain iodide moieties, such $I_3^-$ and $I_5^-$, at the active sites on the resin. Examples of conventional iodinated anion exchange resin include commercially available Microbial Check Valve or MCV® Resin available from Water Security Corp., Sparks, Nev., and iodinated anion exchange resins described in application Ser. No. 13/466,801, filed May 8, 2012, to Theivendran, et al. incorporated herein by this reference. Iodinated anion exchange resins are believed to be structurally different from an "iodinated resin", as defined herein, where iodinated resins comprise iodine residues and iodine intermediate residues on the surface of and in the pores of the resin material. In certain embodiments, "iodinated resins" may also comprise polyiodide chains on at least a portion of the cationic sites of the resin, in addition to the iodine residues and iodine intermediate residues on the surface of and in the pores of the resin material.

As used herein, the term "iodine elution" refers to the elution of iodine ($I_2$) from the resin as water is flowed through the resin. Iodine elution may be measured as concentration in the water effluent in parts-per-million (ppm). Elution of iodine from a resin should be minimized, for example, to ensure longer resin active lifetime, reduce iodine loading on downstream iodine scavenging media and activated carbon, and prevent iodine in the treated water due to saturation of iodine scavenging media. "Iodine leakage" as used herein refers to iodine present in the water effluent after the scavenger resin.

As used herein, the phrases "Log Removal" and "Log reduction value" refer to the $Log_{10}$ of the ratio of the level of contaminants (typically the number of microorganisms) in the influent to the level of contaminants (typically the number of microorganisms) in the effluent.

As used herein, "to reduce contaminants" and "reducing contaminants" refer to disarming one or more contaminants in the fluid, whether by physically or chemically killing, removing, reducing, or inactivating the contaminants or otherwise rendering the one or more contaminants harmless.

In the following description, certain details are set forth to provide a thorough understanding of various embodiments of the apparatuses and/or methods described herein. However, a person having ordinary skill in the art will understand that the various embodiments described herein may be practiced without these details. In other instances, well-known structures and methods associated with the apparatuses and/or methods described herein may not be shown or described in detail to avoid unnecessarily obscuring descriptions of the embodiments described herein.

This disclosure describes various features, aspects, and advantages of various embodiments of water treatment systems as well as methods of making and using the same. It is understood, however, that this disclosure embraces numerous alternative embodiments that may be accomplished by combining any of the various features, aspects, and advantages of the various embodiments described herein in any combination or sub-combination that one of ordinary skill in the art may find useful.

Any patent, publication, or other disclosure material, in whole or in part, recited herein is incorporated by reference herein but only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure provides novel and inventive methods for producing an iodinated resin. The iodinated resin produced according to the various embodiments herein display improved lifetime, reduced iodine elution, and extended microbiological performance compared to conventional iodinated anion exchange resins. In addition, the iodinated resins have a more stable iodine elution independent of temperature and/or pH, compared to conventional iodinated anion exchange resins. Further, the methods are cost effective, producing the iodinated resins while requiring as little as a quarter (25%) of the iodine raw materials for preparation of the iodinated resins, compared to conventional processes for preparing iodinated anion exchange resins. In other embodiments, the methods for making the iodinated resin may require only one-third (33%) of iodine raw materials compared to conventional processes for preparing iodinated anion exchange resins. The loading of less iodine on the resin may also result in less loading of iodine on the downstream iodine scavenging materials, all while providing equivalent or better pathogen removal at extended usage times and/or elevated temperatures, compared to conventional iodinated anion exchange resins.

Conventional iodinated anion exchange resins are prepared by treating an anion exchange resin with a solution prepared by adding iodine crystals to the solution of an iodide salt to first convert the active sites to iodide sites and then bind the iodine to form the iodinated anion exchange resin (see for example, U.S. Pat. Nos. 4,238,477; 4,420,590; and 4,999,190). Alternative approaches may include first loading an strong base anion exchange resin with iodide (i.e., loading iodide (I$^-$) at the cationic sites on the anion exchange resin), followed by treating the resin with a solution prepared by dissolving iodine crystals (I$_2$(s)) in water or aqueous solution to form poly-iodide chains at the iodide residues on the cationic sites on the anion exchange resin. However, conventional processes can result in an iodinated anion exchange resin having long poly-iodide chains on at least a portion of the active sites, which can result in high iodine concentrations in the effluent from the iodinated anion exchange resin during initial elution. Improved methods for preparing iodinated anion exchange resins are described in U.S. application Ser. No. 13/466,801, filed May 8, 2012, where an iodide loaded anion exchange resin is treated with a solution of iodine (I$_2$(aq)) that is formed by reacting solubilized iodide (formed by dissolving an iodide salt, such as KI or NaI in an aqueous solution) with a source of an active halogen oxidant, and then forming shorter polyiodide chains on at least a portion of the active sites. In contrast, the iodinated resins of the various embodiments of the present disclosure differ from iodinated anion exchange resin in that the iodinated resins are believed to comprise iodine (I$_2$) and/or iodine intermediate residues on the surface of the resin and in the pores of the resin and decreased concentrations of iodide residues at the cationic sites of the resin, thereby minimizing the ion-exchange mechanism of binding. Iodinated anion exchange resins typically are not believed to have iodine residues and iodine intermediate residues on the surface of and in the pores of the resin and, instead, comprise a structure where charged polyiodide residues, such as I$_3^-$, I$_5^-$, I$_7^-$, etc., are associated with cationic residues at sites on the ion exchange resin structure and iodine elution proceeds primarily via an ion exchange mechanism. This fundamental difference in structure between the iodinated resins of the present disclosure and iodinated anion exchange resins of the prior art is the result of the novel methods for producing the iodinated resins where the iodine residues and/or iodine intermediate residues on the surface of and in the pores of the resin are produced by in situ oxidation of iodide residues on an iodide loaded anion exchange resin. The iodinated resins of the present disclosure may solve various production inefficiencies and performance limitations associated with conventional iodinated anionic exchange resins, such as lower amounts of iodine raw materials during production and lower iodine elution, without loss of lifetime germicidal activity.

The iodinated resins of the various embodiments of the present disclosure include formation of iodine and/or iodine intermediate residues in and on the resin beads by using an active halogen source to oxidize the iodide residues already on the resin. The resulting iodinated resin comprises iodine and iodine intermediate residues on the surface on and in the pores of the resin materials. According to certain embodiments, at least a portion of any remaining iodide residues on the cationic sites of the resin may subsequently be converted to poly-iodide chains, which may be primarily I$_3^-$, by treating remaining iodide residues on the iodinated resin to an aqueous solution of solubilized iodine. According to these embodiments, the iodinated resin may have both iodine residues and/or iodine intermediate residues on the surface of and in the pores of the resin materials and also poly-iodide chains at cationic sites on the resin.

The iodinated resin may exhibit improved performance in drinking water purification and microbe removal, compared to conventional iodinated anion exchange resin materials. For example, the iodine elution profile for the iodinated resins according to the various embodiments of the present disclosure may have an iodine elution represented by a concentration in the range of 1.0 to 2.5 parts-per-million (ppm) of iodine and from 1.0 to 3.0 ppm of total iodine species eluted over the lifetime of the resin. Other embodiments of the iodinated resins of the present disclosure may have an iodine elution represented by a concentration in the range of 1.0 to 2.0 parts-per-million (ppm) of iodine and from 1.0 to 2.5 ppm of total iodine species eluted over the lifetime of the resin. This improved resin may also display a lower amount of loaded iodide ions since at least a portion of the iodide ions are converted to iodine or iodine intermediate residues on the resin surface of and in the pores of the resin material. According to certain embodiments, this may minimize the ion-exchange mechanism allowing the loaded iodine species and iodine intermediate species on the surface of and in the pores of the resin material to release slowly and completely over time in a desirable concentration range. For embodiments of the iodinated resins that may also include poly-iodide chains on the iodide residues, in addition to the iodine residues and iodine intermediate residues on the surface of and in the pores of the resin material, the poly-iodide chains may be theoretically shorter (i.e., primarily I$_3^-$, with only minor amounts of I$_5^-$, I$_7^-$ and I$_9^-$) and more limited in number due to conversion of at least a portion of the original iodide residues to iodine residues and iodine intermediate residues. The combination of iodine residues and iodine intermediate residues on the surface of and in the pores of the iodinated resin and fewer and shorter poly-iodide chains at the iodide residues may lead to the elimination or near complete elimination of high iodine concentrations in the water at startup elution of a water purification system, caused by elution of long poly-iodide chains. In other words, iodine loss is eliminated at the startup of the water filtration, when the iodinated resin material is first eluted with water.

The iodinated resins of the present disclosure display improved performance at elevated temperatures, such as temperatures greater than 30° C., or even greater than 35° C., and even up to about 40° C., compared to conventional iodinated anion exchange resins used for water purification. While not intending to be limited by any interpretation, the inventors believe that the iodinated resins of the present disclosure, comprising iodine residues and iodine intermediate residues on the surface of and in the pores of the resin material, and in certain embodiments short poly-iodide chains, present an optimal ratio of iodine to iodide residues on and in the resin, such that less temperature sensitivity with respect to elution of the iodine species is observed. In other words, the iodinated resins of the present disclosure display reduced iodine elution when used at elevated temperatures compared to conventional iodinated anion exchange resins. This feature may be desired in international markets, particularly since many areas having contaminated water and in need of commercially viable water purification methods are located in temperate zones, such as near the equator, where elevated temperatures may be more prevalent.

In addition to utilizing less iodine raw materials during production, displaying reduced iodine elution during the initial water elution, and displaying improved performance at elevated temperature, the iodinated resins of the various embodiments of the present disclosure may display equal or better microbial, bacterial, and viral (including for example, MS2 coliphage) removal during initial operation compared to conventional iodinated anion exchange resins and may be useful and show suitable kill rates at temperatures up to 45° C. For example, in various embodiments of the iodinated resins of the present disclosure, the iodinated resin elutes iodine in the effective germicidal range of 1.0 to 2.5 ppm during initial and extended operation and from 1.0 to 3.0 of total iodine species during initial and extended operation. In addition, the iodinated resins of the present disclosure may display a Log reduction value for viruses of at least 4 and a Log reduction value for bacteria and microbes of at least 6 at a temperature range from about 4° C. to about 45° C.

An additional beneficial feature of the iodinated resins of the present disclosure is the capability of acting as an end-of-life indicator, showing when the iodine loading on the iodinated resin has decreased and germicidal effectiveness will soon be reduced. It is economically important in drinking water purification applications that there is complete elution (i.e. up to 100%) of the iodine species from the iodinated resin. In particular embodiments of the iodinated resins of the present disclosure, the loaded iodinated resin will have a dark, purple color generally associated with the presence of iodine on the iodinated resin. During the useful lifetime of the water filtration system, as contaminated water is eluted through the iodinated resin and microbial contaminants are deactivated by the iodine and iodine intermediate residues and/or iodine is eluted away from the iodinated resin, the color of the iodinated resin changes to a non-purple, off-white color, indicating the reduction of or absence of iodine on the iodinated resin. This change of color can be visibly observed as water elutes through the resin and the color changes, starting from the water inlet side and slowly progressing to the water outlet side, until the majority of the iodinated resin has become a non-purple color or off-white color indicating the point at which the useful lifetime of the iodinated resin is over. This feature may serve as an indicator of end-of-life of the iodinated resin, allowing for replacement of the iodinated resin with new active iodinated resin material and optionally, regeneration of the spent iodinated resin, as described herein. This end-of-life indicator feature is not present in conventional iodinated anion exchange resins, which tend to maintain a purple color throughout the lifetime of the resin material. While not intending to be limited by any theory, the inventors believe that this end-of-life color change feature is further indication of a different active species and structure of the iodinated resin compared to conventional iodinated anion exchange resin. For example, with conventional iodinated anion exchange resins, it is not possible to elute all of the loaded poly-iodide residues from the beads of the ion exchange resin by an anion exchange mechanism. In contrast, the iodinated resins of the present disclosure have the potential to elute almost all of the loaded iodine and iodine intermediate residues from the surface of and in the pores of the resin beads, resulting in a more efficient depletion of iodine species from the resin and resulting in an observable color change.

A further benefit of the iodinated resins according to the present disclosure is the lack of significant out-gassing of iodine from the iodinated resin during storage. This offers an economic advantage, since active iodine species are not lost during storage and the lifetime of the iodinated resin is extended. In addition, certain conventional iodinated anion exchange resins, such as MCV® iodinated anion exchange resin, may display out-gassing of iodine which may include leaching of the iodine into surrounding water with wet storage and/or sublimation of iodine into surrounding packaging materials during dry storage. Due to the reactivity of iodine, for example with components of plastic packaging materials, iodine out-gassing may result in compromised resin and packaging materials due to the iodine reacting with and degrading the packaging materials.

According to the various embodiments of the iodinated resins of the present disclosure, there are both manufacturing benefits and changes in chemical compositions of the resin product compared to conventional iodinated anion exchange resins, such as, for example MCV® iodinated anion exchange resin and even the iodinated anion exchange resins described in U.S. application Ser. No. 13/466,801. For example, the ratio of iodine ($I_2$) to iodide ($I^-$) in the iodinated resins of the various embodiments of the present disclosure is lower than that of conventional iodinated anion exchange resins, such as MCV® iodinated anion exchange resins. With reference to the iodinated anion exchange resin described in U.S. application Ser. No. 13/466,801, the manufacture of this iodinated anion exchange resin utilizes a process which includes treating an iodide loaded resin with aqueous iodine, where the iodine is formed in solution by a chemical process (defined as "ex situ" in the present application with respect to the resin bead) for example, by reacting solubilized KI or NaI with an active halogen oxidant to form solubilized iodine ($I_2$(aq)). In the case of the iodinated anion exchange resins in the U.S. application Ser. No. 13/466,801, the iodine is loaded onto the iodide residues on the resin beads by an ion exchange resin to form poly-iodide chains, preferably short poly-iodide chains, such as primarily $I_3^-$ with some amount of $I_5^-$. In contrast, as described herein, the iodinated resins of the present disclosure includes an oxidation step which takes place inside (i.e., within pores of) and on the surface of the resin beads (defined herein as "in situ" with respect to the resin bead). Utilizing the approach described in the various embodiments of the present disclosure, the iodide on the surface of and in the pores of the resin beads are oxidized to iodine and iodine intermediate residues on the surface of and in the pores of the resin to create the present iodinated resins. According to the various embodiments, the load of iodide on the resin bead (i.e., the number of iodide residues on the bead) is thereby decreased and iodine and iodine intermediate residues are formed on the surface of and in the pores of the resin without the presence of a solubilized iodine species, as shown in the methods for preparing iodinated anion exchange resins by dissolving iodine crystals ($I_2$(s)) in water or forming solubilized iodine ($I_2$(aq)) in solution by a chemical process.

In certain embodiments, the iodinated resins having iodine and iodine intermediate residues on the surface of and in the pores of the resin bead may be further treated with solubilized aqueous iodine ($I_2$(aq)). According to these embodiments, any remaining iodide residue on the iodinated resin beads may be converted to poly-iodide chains, for example, in certain cases primarily $I_3^-$ chains. Since the processes of the present disclosure result in reduced concentrations of iodide residues on the resin, converting the iodide residues to poly-iodide chains requires significantly reduced amounts of solubilized iodine. For example, in certain embodiments, the amount of solubilized iodine necessary to convert any remaining iodide residues to poly-iodide chains may be reduced by about 67% by weight (i.e., forming poly-iodide chains on the resins of the present disclosure may require only ⅓ of the amount of iodine), compared to methods for producing poly-iodide chains in conventional iodinated anion exchange resins. In certain embodiments, the solubilized iodine ($I_2$(aq)) used to treat the iodinated resins of the present disclosure may be produced by dissolving iodine crystals ($I_2$(s)) in water or aqueous solution. Because of the decreased amount of solubilized iodine required to produce poly-iodide chains on the reduced number of iodide residues on the iodinated resin, drawbacks from using dissolved iodine crystals, such as low iodine solubility and long treatment times, are minimized. According to other embodiments, the solubilized iodine ($I_2$(aq)) used to treat remaining iodide residues on the iodinated resins of the present disclosure may be produced by the methods described in U.S. application Ser. No. 13/466,801, such as by reacting an aqueous solution of solubilized iodide with an active halogen source to oxidize the soluble iodide to solubilized aqueous iodine ($I_2$(aq)). Because of the decreased amount of solubilized iodine required to produce poly-iodide chains on the reduced number of iodide residues on the iodinated resin, the amount of iodide salt and active halogen source necessary to form the poly-iodide chains is minimized. One of skill in the art would understand that other conventional methods of forming solubilized iodine could potentially be utilized to form poly-iodide chains on the remaining iodide residues on the iodinated resins of the present disclosure. In any event, the iodinated resins according to the various embodiments of the present disclosure include reduced amounts of iodide, active halogen, and iodine, compared to conventional methods for preparing iodinated anion exchange resins, such as MCV® iodinated anion exchange resins, resulting in a more efficient process for the production of resins for water treatment and improved performance for the iodinated resins described herein. For example, compared to the costs associated with the production of MCV® iodinated anion exchange resins, the various embodiments of the iodinated resin of the present disclosure require from 25% to 33.3% by weight of the iodine raw materials to produce iodinated resins with similar lifetimes and microbial kill values as MCV® iodinated resins; and require about 40 to 50% by weight of the iodine raw materials to produce iodinated resins compared to the iodinated anion exchange resins described in U.S. Ser. No. 13/466,801. Further, when considering various aspect of the production of the iodinated resins of the present disclosure, including the amounts of iodine, iodide, active halogen source, the iodinated resins described herein may result in a cost savings of up to about 50%, compared to costs associated with the preparation of conventional iodinated anion exchange resins, such as an MCV® iodinated anion exchange resin.

According to various embodiments, the present disclosure provides methods for the preparation of iodinated resins. The methods may comprise converting iodide ions on a surface of and in the pores of an iodide loaded anion exchange resin to iodine and iodine intermediate residues by oxidizing the iodide ions on a surface of and in the pores of the iodide loaded anion exchange resin with a source of active halogen at a pH of less than about 7.0 to form an iodinated resin having iodine and iodine intermediate residues on the surface of and in the pores of the resin. Without intending to be limited by any particular theory, it is believed that the source of active halogen oxidizes the iodide residues on the iodide loaded anion exchange resin to iodine residues and iodine intermediate residues (such as HOI) on the surface of and in the pores of the resin. One embodiment of the in situ, oxidative chemical process may be represented by Equation 1 (where X is Cl or Br):

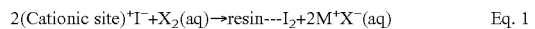

$$2(\text{Cationic site})^+I^- + X_2(aq) \rightarrow \text{resin---}I_2 + 2M^+X^-(aq) \qquad \text{Eq. 1}$$

According to this theory, iodide residues on cationic sites of the anion exchange residues are converted to iodine and iodine intermediate residues on the surface of and in the pores of the resin (according the Eq. 1, the "---" indicates a non-covalent attraction between the surface of the resin (or inner surface of a pore of the resin) and the newly formed iodine residue or iodine intermediate residue. As shown in Eq. 1, two iodide residues on cationic sites are reacted to form the iodine on the surface of and in the pores of the resin. Alternatively, an iodide residue on a cationic site may be oxidized to form an iodine intermediate residue (HOI) on the surface of and in the pores of the resin.

According to the embodiments of the methods described herein, the source of active halogen may comprise a chemical entity that produced active halogen in aqueous solution. For example, in certain embodiments, the source of active halogen may produce at least one of chlorine ($Cl_2$) or hypochlorite ($OCl^-$) and bromine ($Br_2$) or hypobromite ($OBr^-$) in the aqueous solution. In specific embodiments, the source of active halogen may be a source of active chlorine. Various examples of sources of active chlorine include chlorine gas ($Cl_2$(g)), trichloroisocyanuric acid ("TCCA"), sodium dichloroisocyanuriate, hypochlorite salts, such as sodium hypochlorite and calcium hypochlorite, hypochlorous acid, and various combinations of any thereof. In specific embodiments, the source of active halogen may be a source of active chlorine, such as trichloroisocyanuric acid at a pH value of less than 7.0 in aqueous solution. Since in certain embodiments, the active chlorine source, such as TCCA, may not release 100% chlorine, conditions may require excess TCCA or other chlorine source. As shown in equation 1, the source of active halogen is added in a concentration to provide sufficient active halogen to react with at least a portion of the iodide residues at the cationic sites of the exchange resin, for example in a ratio of 2:1 iodide residues to active halogen. In specific embodiments, the concentration of the active halogen produced by the source of active halogen will range from about 1% to about 10% by weight or in other embodiments from about 5% to about 10% by weight.

Other methods for converting iodide ions on cationic sites of the anion exchange resins to iodine and iodine intermediate residues on the surface of and in the pores of the resin may also be suited for the various methods of the present disclosure. Methods such as other redox processes to produce in situ the iodine and iodine intermediate residues on the resin pores and surfaces from iodide residues at cationic sites on the resin, such as, electrochemical methods, electrolytic methods, and electron transfer methods, are also contemplated and are to be considered to be within the scope of the present disclosure.

According to embodiments described herein, converting iodide ions at cationic sites of an iodide loaded anion exchange resin to iodine and iodine intermediate residues on the surface of and in the pores of the resin, the method may further comprise loading additional iodine ($I_2$) onto the iodinated resin using a source of soluble aqueous iodine. As described herein, converting the iodide ions at cationic sites to iodine and iodine intermediate residues on the surface of and in the pores of the iodinated resin, may result in decreased concentrations or numbers of iodide residues at cationic sites on the anion exchange resin. These remaining iodide residues at cationic sites may be converted to poly-iodide chains at the cationic sites by treating or loading the iodide residues with additional iodine using a source of soluble iodine ($I_2$(aq)). Examples of sources of soluble iodine include dissolving iodine crystals in water or aqueous solution, treating an aqueous solution of solubilized iodide ion ($I^-$) with a source of active halogen oxidizing agent via a redox reaction, as shown in equation 2 and described in U.S. application Ser. No. 13/466,801, or combinations of these methods. In certain embodiments, the source of soluble iodine may be iodine crystals dissolved in an aqueous solution. In other embodiments, the source of soluble iodine may be formed by reacting an aqueous solution of solubilized iodide ions with a source of active halogen. According to this embodiment, the source of active halogen may be a source of active chlorine selected from the group consisting of chlorine gas ($Cl_2(g)$), trichloroisocyanuric acid ("TCCA"), sodium dichloroisocyanuriate, hypochlorite salts, such as sodium hypochlorite and calcium hypochlorite, hypochlorous acid, and various combinations of any thereof.

According to embodiments where the solubilized iodine ($I_2$(aq)) is formed ex situ, the iodide salt may be in the form of an aqueous solution, where the aqueous solution has an iodide concentration of from about 1% to about 50% by weight, or in other embodiments from about 15% to about 40% by weight, or even about 20%. Lower concentrations of iodide solutions can be used with greater volume. In general, the iodine saturation level in aqueous solution is around 300 ppm. In certain embodiments, the source of active halogen may produce molecular chlorine ($Cl_2$) or molecular bromine ($Br_2$). In specific embodiments, the source of active halogen may be a source of molecular chlorine ($Cl_2$). As shown in equation 2, the source of active halogen is added in a concentration to provide sufficient molecular halogen to react with the iodide in solution, for example in a ratio of 2:1 iodide to active halogen. In specific embodiments, the concentration of the molecular halogen produced by the source of active halogen will range from about 1% to about 10% by weight or in other embodiments from about 5% to about 10% by weight. While higher halogen concentrations may be used, at higher concentrations of molecular halogen, solubilized $I_2$ may be produced in quantities larger than can be readily adsorbed by the resin which may lead to evaporation of excess $I_2$ from the solution. For example, TCCA may be added to a solution of iodide salt with a total added TCCA concentration of from about 1% to about 10% by weight. While, the maximum concentration TCCA can form only 1.2% (12 g/L) of molecular chlorine, larger amounts may be added since reaction with the soluble iodide removes the TCCA from solution. According to certain embodiments, 8 g of TCCA solid may be gradually added to about 100 mL of KI solution to form $I_2$ ex situ.

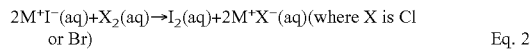

$$2M^+I^-(aq)+X_2(aq) \rightarrow I_2(aq)+2M^+X^-(aq) \text{(where X is Cl or Br)} \qquad \text{Eq. 2}$$

The $I_2$ may be formed in the presence iodinated resin. For example, the iodinated resin having remaining iodide residues at cationic sites on the resin may be placed in an aqueous solution of the iodide salt and then the source of active halogen may be added to produce the iodine in solution in the presence of the resin. In another embodiment, iodine may be formed in solution, either by solubilizing crystalline iodine or by the reaction expressed in Eq. 2, and the solution thereafter may be exposed to the iodinated resin having remaining iodide residues at cationic sites on the resin, for example in a batch-wise or continuous process, for example, by flowing the solution of solubilized iodine over a bed of the resin. According to various embodiments, the solubilized iodine may then react with $I^-$ anions in the cationic site of the resin to produce predominantly short poly-iodide chain groups, such as predominantly $I_3^-$. According to these embodiments, the solubilized iodine reacts with at least a portion of $I^-$ anions remaining at the cationic sites of the iodinated resin to produce predominantly $I_3^-$ groups. As used herein, the term "predominantly" when used in conjunction with loading of the $I_3^-$ cationic sites of the resin means at least 70% of the remaining iodide loaded cationic sites, or in other embodiments, at least 80%, and in still other embodiments, at least 90% or even at least 95% of the remaining iodide loaded cationic sites.

For various embodiments of the iodinated resins, the inventors have determined that it may be preferred that, in addition to the iodine and iodine intermediate residues on the surface of and in the pores of the iodinated resin, at least a portion of the cationic sites may be functionalized with short poly-iodide chains, such as $I_3^-$ chains. Without intending to be limited by any theory, it is believed that resins with longer poly-iodide chains, such as $I_5^-$, $I_7^-$, $I_9^-$, etc., at the cationic sites can result in increased iodine elution by a mechanism in which the longer poly-iodide are removed at the early stage of the elution. The long poly-iodide chains result in an initial high-iodine ($I_2$) release that cannot be controlled. It is believed that the combination of the different structure of the iodinated resins (compared to iodinated anion exchange resins) where the iodinated resin comprises iodine and iodine intermediate residues on the surface of and in the pores of the resin, along with the reduced number of iodide bound cationic sites available to form poly-iodide chains results in a iodine elution profile where iodine elution remains essentially constant over the entire elution cycle and the total iodine ("TI") elution for the iodinated resin is less than conventional iodinated anion exchange resins. That is, for the iodinated resins of the present disclosure, the iodine elution profile and TI elution, even at the beginning of water elution remains essentially constant and essentially the same as values at extended water elution.

Figure 2:
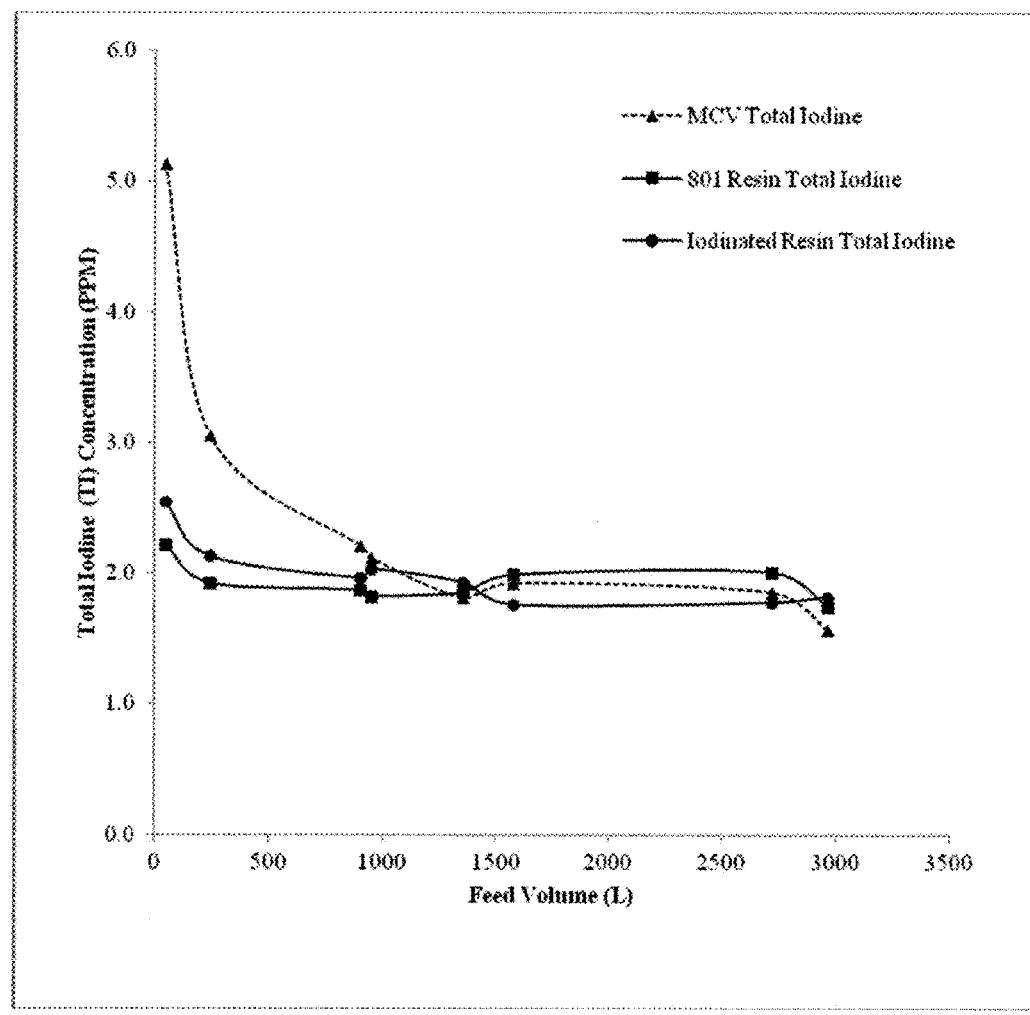
FIG. 2 illustrates the room temperature total iodine species ("TI") elution profiles of conventional iodinated anion exchange resins and the iodinated resin according to the present disclosure.
Figure 3:
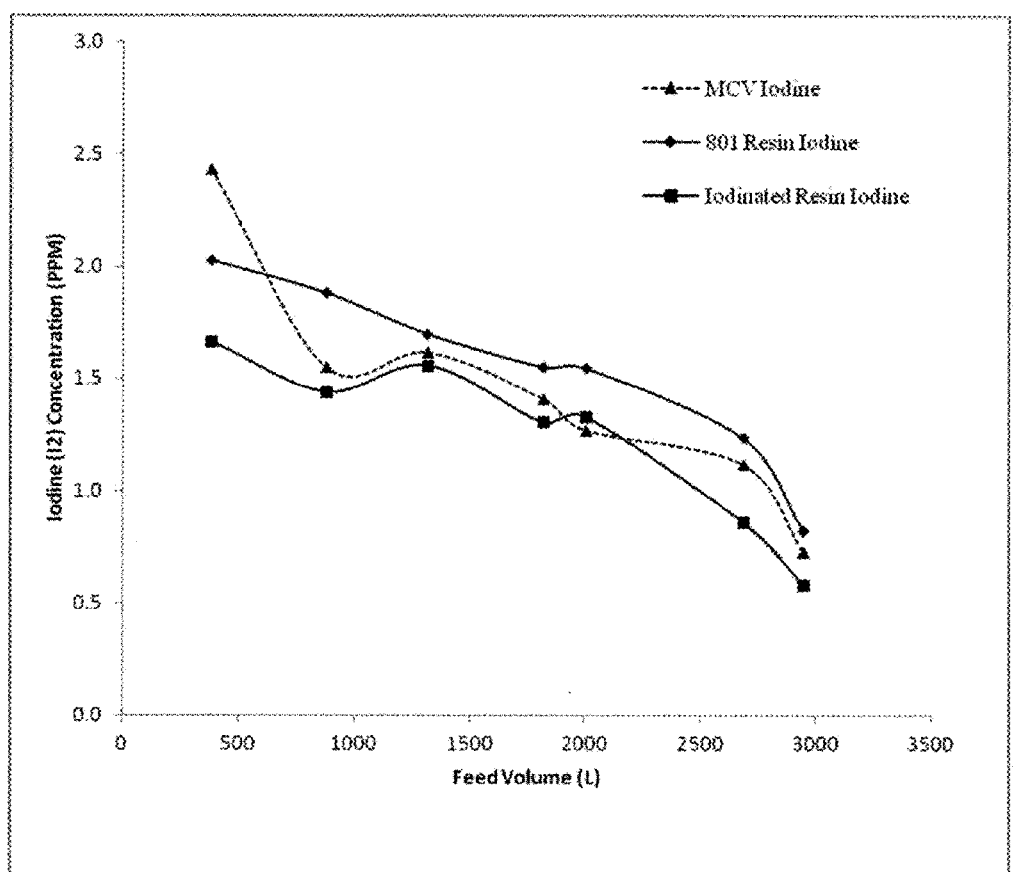
FIG. 3 illustrates the high temperature iodine elution profiles of conventional iodinated anion exchange resins and the iodinated resin according to the present disclosure.
Figure 4:
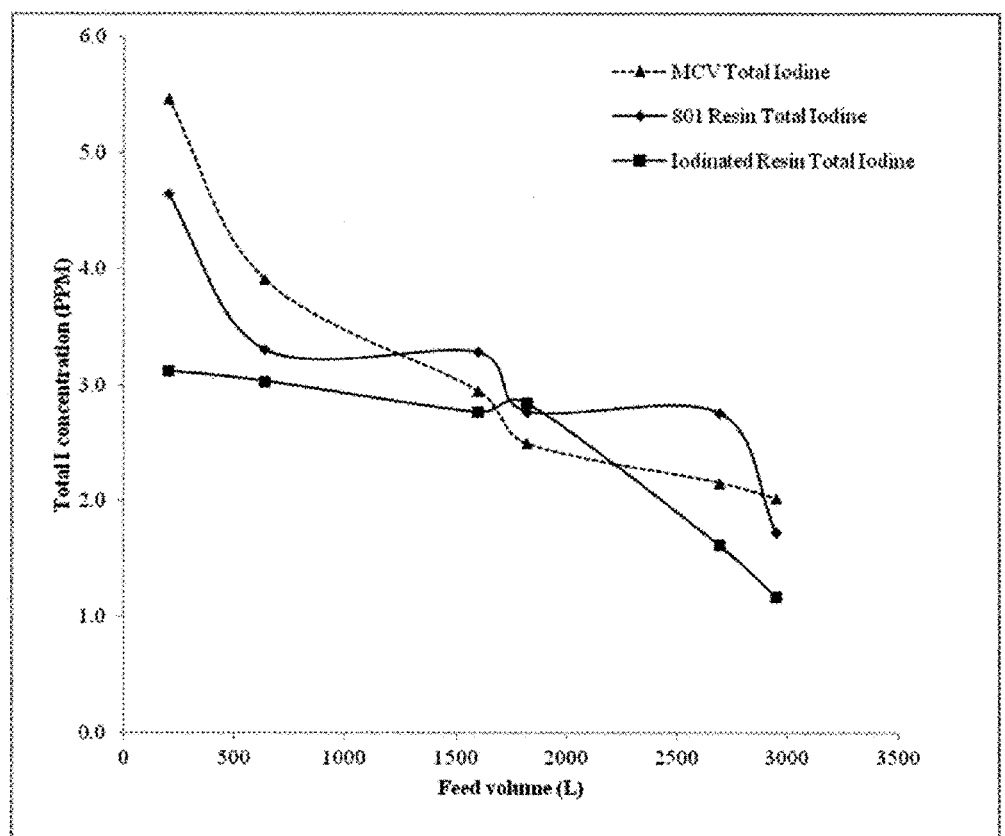
FIG. 4 illustrates the high temperature TI elution profiles of conventional iodinated anion exchange resins and the iodinated resin according to the present disclosure.

The iodinated resins prepared by the various embodiments of the methods described herein may display improved elution profiles compared to conventional iodinated anion exchange resins. Comparative iodine and TI elution profiles of iodinated resins prepared by the methods described herein and conventional iodinated anion exchange resins are presented in FIGS. 1 and 2. FIG. 1 illustrates the iodine ($I_2$) elution profiles at 23° C. of commercially available MCV® iodinated anion exchange resin (commercially available from MCV Manufacturing Inc., Sparks, Nev.) prepared by conventional methods, the iodine ($I_2$) elution profiles of an iodinated anion exchange resin prepared according to the methods of U.S. application Ser. No. 13/466,801, and the iodinated resins of the present disclosure. FIG. 2 illustrates the TI elution profiles at 23° C. of commercially available MCV® iodinated anion exchange resin prepared by conventional methods, the TI elution profiles of an iodinated anion exchange resin prepared according to the methods of U.S. application Ser. No. 13/466,801, and the TI elution profile of iodinated resins of the present disclosure. As can be seen by FIGS. 1 and 2, iodine elution and TI elution for the iodinated resins of the present disclosure display substantially constant and improved elution curves compared to conventional iodinated anion exchange resins. For example, iodine elution from resins prepared by the methods described herein display iodine elution values of less than 2.5 ppm over the entire feed volume (for example, ranging from 1.0 to 2.5 ppm) and display TI elution values of less than 3.0 (for example, ranging from 1.0 to 3.0 ppm) over the entire feed volume when measured at room temperature. Further, the iodine elution and TI elution of the iodinated resins of the present disclosure remain constant, even at elevated temperatures of greater than 35° C. or even greater than or equal to 40° C. up to 45° C. FIG. 3 illustrates high temperature iodine ($I_2$) elution profiles of commercially available MCV® iodinated anion exchange resin (commercially available from MCV Manufacturing Inc., Sparks, Nev.) prepared by conventional methods, the iodine ($I_2$) elution profiles of an iodinated anion exchange resin prepared according to the methods of U.S. application Ser. No. 13/466,801, and the iodinated resins of the present disclosure. FIG. 4 illustrates high temperature TI elution profiles of commercially available MCV® iodinated anion exchange resin prepared by conventional methods, the TI elution profiles of an iodinated anion exchange resin prepared according to the methods of U.S. application Ser. No. 13/466,801, and the TI elution profile of iodinated resins of the present disclosure. As can be seen by FIGS. 3 and 4, iodine elution and TI elution for the iodinated resins of the present disclosure display lower elution curves compared to conventional iodinated anion exchange resins. For example, even at elevated temperatures (40° C.), iodine elution from resins prepared by the methods described herein display iodine elution values of less than 2.5 ppm (for example, ranging from 1.0 to 2.5 ppm) over the entire feed volume and display TI elution values of around 3.0 or less (for example, ranging from 1.0 to 3.0 ppm) over the entire feed volume.

According to certain embodiments, the methods for producing the iodinated resins of the present disclosure may further comprise the step of treating a chloride form anion exchange resin with an aqueous solution of a soluble iodide salt to form the iodide loaded resin. According to these embodiments, an anion exchange resin, such as a strong base anion exchange resin, for example, a resin having a plurality of quaternary ammonium cationic sites, having non-iodine counteranions, such as chloride counteranions, may be treated with an aqueous solution of a first soluble iodide salt to form the iodide loaded anion exchange resin. For example, in one embodiment, a chloride form strong base anion exchange resin may be treated with an aqueous solution of a first soluble iodide salt, such as potassium iodide (KI), sodium iodide (NaI) or a combination thereof. Other soluble iodide salts may also be utilized to load the anion exchange resin with iodide. In one embodiment, the anion exchange resin may be treated with an aqueous solution of a first soluble iodide salt having an iodide concentration ranging from 1% to 50% by forming a slurry of the resin in the solution and stirring at a temperature ranging from about 20° C. to about 40° C. for a time ranging from about 5 min to about 60 min. The treatment process may optionally be repeated two or more times. The iodide loaded anion exchange resin containing iodide ions on the surface of and in the pores of the iodide loaded anion exchange resin may be directly converted to iodine and iodine intermediate residues on the surface of and in the pores of the resin.

According to certain embodiments, conversion of an iodide loaded anion exchange resin to an iodinated resin, as described herein, may include mixing a slurry of the iodide loaded anion exchange resin in the aqueous solution of the active halogen source at a pH value of less than 7.0, such as by slowly adding TCCA solid to the slurry with stirring. In certain embodiments, the pH value may be 5.0 or less, or even about 4.0. In certain embodiments, the reaction mixture is stirred at a temperature ranging from about 20° C. to about 40° C. for a time ranging from about 5 min to about 24 hours, although one of skill in the art would understand that reaction time and temperature may vary due to concentration and type of the reactants (i.e., iodide content on the iodide loaded resin and source of active halogen). The process of treating the resin to form in situ iodine and iodine intermediate residues on the surface of and in the pores of the resin may be repeated, for example two or more additional times, to ensure maximum iodine formation on the resin. The iodinated resin may then be removed from the reaction solution, for example by decantation or filtration, and washed with de-ionized water to remove any residual reactants.

In certain application, such as large scale water treatment facilities, it may be economically desirable to recycle or regenerate spent iodinated resins to produce regenerated iodinated resins that can further be used to remove/kill microbial and viral contaminants in water supplies. According to certain embodiments, the methods of preparing iodinated resin according to the present disclosure may further comprise recycling the iodinated resin after use. The used iodinated resin having a depletion of the iodine and iodine intermediate residues on the resin and in the pores of the resin, as shown by at least a portion of the resin being a non-purple color, may be regenerated or recycled into active iodinated resin. According to this embodiment, the process may further comprise treating the used resin to an aqueous solution of solubilized iodide ion to form a recycled iodide loaded anion exchange resin and converting the iodide on the surface of and in the pores of the recycled iodide loaded anion exchange resin to iodine ($I_2$) and iodine intermediate residues on the surface of and in the pores of the resin with a source of active halogen at a pH value of less than about 7.0 to form a recycled or regenerated iodinated resin. The iodide loading of the used resin and the treating the iodide loaded anion exchange resin with an active halogen source may be accomplished using the procedures as described herein. According to these embodiments on recycling or regenerating the iodinated resin, at least a portion of the used iodinated resin may have a non-purple color (typically the color of the original resin bead) indicating the depletion of iodine and iodine intermediate residues from the surface of and from the pores of the resin and wherein the recycled or regenerated iodinated resin may have a purple color indicating the presence or iodine on the surface of and in the pores of the iodinated resin. According to specific embodiments, the iodinated resins of the present disclosure may be recycled or regenerated at least once and in other embodiments, the iodinated resins may be recycled or regenerated a plurality of times, thereby allowing the user to realize significant cost savings, particularly when large quantities of iodinated resin are used in the water treatment system.

According to other embodiments, the methods of producing an iodinated resin as described herein, may include the steps of treating a chloride form anion exchange resin with an aqueous solution of a soluble iodide salt to form an iodide loaded anion exchange resin, oxidizing the iodide ions on a surface of and in the pores of the iodide loaded anion exchange resin with a source of active chlorine at a pH of less than about 7.0 to form an iodinated resin having iodine and iodine intermediate residues on the surface of and in the pores of the iodinated resin and loading the iodinated resin further with iodine in the form of poly-iodide chains using an aqueous solution comprising a source of soluble iodine ($I_2$). According to these embodiments of the method, treating a chloride form anion exchange resin with an aqueous solution of a soluble iodide salt may include treating the chloride form of the anion exchange resin with an aqueous solution of a soluble iodide salt selected from KI, NaI and combinations thereof. Methods of treating a chloride form anion exchange resin with an aqueous solution of a soluble iodide salt are described in detail herein. Oxidizing the iodide ions on the surface of and in the pores of the iodide loaded anion exchange resin may comprise any of the sources of active chlorine described herein. In specific embodiments, oxidizing the iodide ions on the surface of and in the pores of the iodide loaded anion exchange resin may comprise treating the iodide ions with a solution of trichloroisocyanuric acid (TCCA) at a pH of less than about 7.0 to form iodine on the surface of and in the pores of the iodinated resin. Methods of treating and oxidizing the iodide ions on the surface of and in the pores of the iodide loaded anion exchange resin are described in detail herein. Subsequent to treating or oxidizing the iodide ions on the surface of and in the pores of the iodide loaded anion exchange resin with a source of active chlorine, the resulting iodinated resin may display fewer iodide residues at cationic sites on the resin, since it is believed that at least a portion of, and in some cases a majority of, the iodide at the cationic sites has been converted to iodine and iodine intermediate residues on the surface of and in the pores of the resin. At least a portion of the remaining iodide residues on the cationic sites of the iodinated resin may be converted to short poly-iodide chains by loading the iodinated resin with iodine using an aqueous solution of a source of soluble iodine. Examples of further loading the iodinated resins to convert remaining iodide residues at cationic sites to short poly-iodide chains are described herein and may include using an aqueous solution of dissolved iodine crystals and/or using an aqueous solution where the soluble iodine is formed in the solution by a chemical process, such as any of the various processes described herein. The methods described herein may produce iodinated resins that display a Log reduction value for viruses of at least 4 and a Log reduction value for bacteria of at least 6 at a temperature range from about 4° C. to up to 45° C.

As discussed herein, it is believed that the iodinated resins having iodine and iodine intermediate residues on the surface of and in the pores of the resin has a different structure that iodinated anion exchange resins prepared by conventional methods. For example, it is believed that the release of iodine from the iodinated resins described herein occurs by a different, non-ion exchange mechanism, whereas release of iodine from iodinated anion exchange resins occurs primarily via an ion exchange mechanism. As described herein, the iodinated resins prepared herein display improved iodine elution properties and utilize significantly less iodine during manufacturing compared to the amount of iodine used in conventional methods for preparing iodinated anion exchange resins, while displaying similar kill rates for microbial and viral contaminants in water treated by the iodinated resins. For example, in certain embodiments, the methods for preparing iodinated resins described herein may utilize 40% by weight or less of an amount of iodine during the manufacturing process compared to the amount of iodine necessary for conventional methods for preparing iodinated anion exchange resins, and in certain cases, the methods may utilize 33.3% by weight or less of the amount of iodine compared to the amount of iodine necessary for conventional methods for preparing iodinated anion exchange resins.

Figure 5:
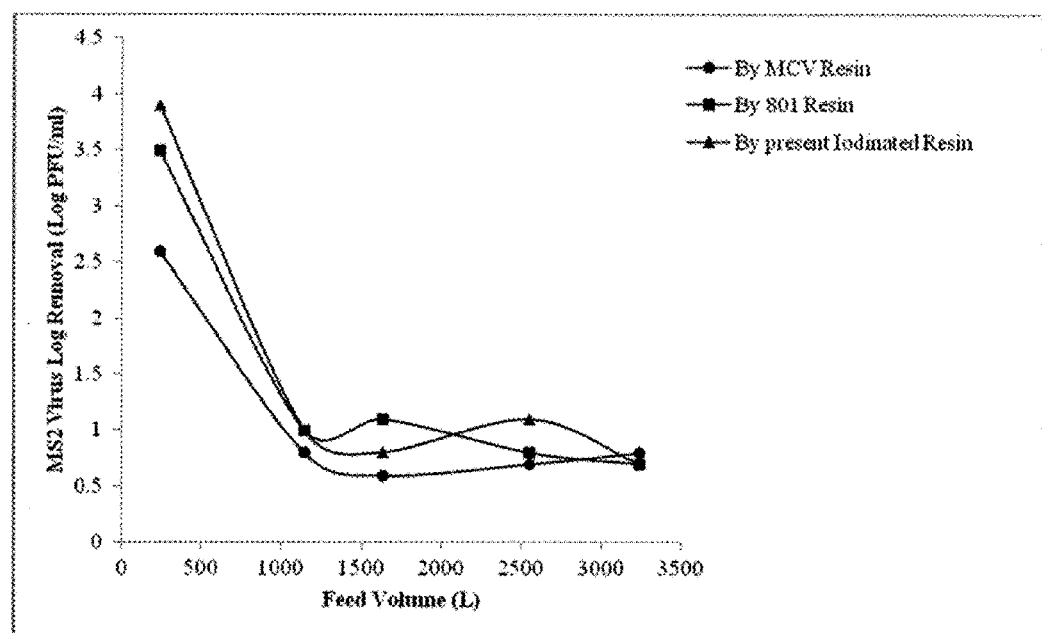
FIG. 5 illustrates MS2 removal profiles at room temperature for conventional iodinated anion exchange resins and the iodinated resin according to the present disclosure.

Still other embodiments of the present disclosure provide for an iodinated resin, such as an iodinated resin prepared by the various embodiments of the methods described herein. According to these embodiments, the iodinated resins of the present disclosure comprise iodine residues and iodine intermediate residues on the surface of and in the pores of the iodinated resin and wherein the iodinated resin displays a Log reduction value for viruses of at least 4 and a Log reduction value for bacteria of at least 6 upon treatment of microbial contaminated water over a temperature range from about 4° C. to about 45° C. FIG. 5 shows a plot for removal of MS2 viral contaminants from water using the iodinated resins of the present disclosure compared to conventional iodinated anion exchange resins, such as MCV and those prepared according to U.S. application Ser. No. 13/466,801. As shown in FIG. 5, iodinated resins of the present disclosure display similar MS2 removal values over the feed volume compared to conventional iodinated anion exchange resins, even though significantly lower amounts of iodine are used in the manufacturing process of the iodinated resins. As described herein, it is believed that the iodinated resins have a different active structure compared to iodinated anion exchange resins and the iodinated resins of the present disclosure operate by primarily a non-ion exchange mechanism, where the iodine residues and iodine intermediate residues on the surface of and in the pores of the iodinated resin react with and kill microbial contaminants in contaminated water. Of course, since certain embodiments of the iodinated resin may also be treated such that any remaining iodide residues on cationic sites on the resin may be converted to short chain poly-iodide chains (e.g., $I_3^-$ and $I_5^-$), these poly-iodide chains likely react with microbial contaminants by a conventional ion exchange mechanism, such that certain embodiments of the iodinated resins may act by a combination of a non-ion exchange mechanism and an ion exchange mechanism, to provide optimal microbial decontamination of water treated with the iodinated resins described herein.

As described herein, specific embodiments of the iodinated resin may act as an end-of-life indicator, where the color of at least a portion of the iodinated resin may change from a purple color to a non-purple color. According to these embodiments, the purple color indicates the presence of iodine and iodine intermediate residues on the surface of and in the pores of the resin, whereas the non-purple color indicates a depletion of iodine and iodine intermediate residues on the surface of and in the pores of the resin. The color change from purple to non-purple occurs as iodine is eluted from the iodinated resin, for example as iodine and iodine intermediate residues on the surface of and in the pores of the iodinated resin reacts with and kills bacterial and/or viral contaminants in water as the water is eluted through the resin. Typically, the non-purple color may be the color of the original resin material, such as an off-white color, although other resin colors are possible. According to these embodiments, the user of a water filtration/purification system incorporating the iodinated resins herein may monitor the color of the iodinated resin and, as the purple color dissipates and the resin becomes a non-purple color, recognize that the iodinated resin may be at the end of its useful life for removing/killing bacterial or viral contaminants in the water being treated or recognize that the iodinated resin is in need of regeneration and/or recycling by the methods recited herein. Upon noticing the color change and the dissipation of the purple color, the user of the water filtration system may either replace the depleted iodinated resin with new, active iodinated resin or regenerate the resin to produce active, regenerated iodinated resin. The end-of-life indicating capability of the iodinated resins described herein provides an easy, visual way to determine whether the resin is depleted or almost depleted of iodine and iodine intermediate residues, thereby providing benefits over conventional iodinated anion exchange resins that may require complex test methods and/or instrumentation to determine whether the iodinated anion exchange resin is still active and capable of killing microbial/viral contaminants. The depleted iodinated resin may be discarded or, alternatively, regenerated according to the methods described herein. The regeneration of the iodinated resin may be conducted on site or the depleted resin may be shipped to a facility where the resin will be regenerated and optionally returned to the user. FIG. 10 displays the end-of-life indicator capability of the iodinated resin prepared herein compared to conventional MCV® iodinated anion exchange resin. As can be seen in FIG. 10B, after aging with 5000 L of water elution at 41° C., the iodinated resin displays a non-purple color at the resin near the water inlet, with some remaining purple-colored resin near the outlet end of the resin column, indicating partial depletion of iodine from the iodinated resin. In contrast, FIG. 10A shows conventional MCV® iodinated anion exchange resin under the same conditions remains a purple color through out the resin column. Iodide elution values remain similar for the iodinated resin and the MCV® iodinated anion exchange resin after 5000 L, 1.9 ppm and 2.3 ppm, respectively.

According to the various embodiments, the iodinated resin recited herein, the iodinated resin displays a shallow iodine elution profile over the entire elution of water through the iodinated resin. Iodinated anion exchange resins prepared using conventional processes may display initial high values of iodine elution, for example during the first 500 L to 1000 L of water elution through the conventional iodinated resins (see, for example, FIGS. 1 and 3). This is believed to be due to higher concentrations of long poly-iodide chains on the conventional iodinated anion exchange resins and/or the different release mechanism for the iodine from the iodinated resin (i.e., non-ion exchange mechanism). In contrast, iodinated resins described herein display an iodine elution of less than about 2 ppm during the entire elution of water through the iodinated resin and in certain embodiments, less than about 1.5 ppm, even at elevated temperatures up to about 45° C.

Still other embodiments of the present disclosure provide for methods of treating water. According to these embodiments, the methods may comprise the steps of eluting water comprising at least one microbial contaminant through the iodinated resin prepared or regenerated by a process according to any of the various embodiments described herein. According to one embodiment, the iodinated resin may be prepared or regenerated by a process comprising treating an iodide loaded anion exchange resin with a source of an active halogen in an aqueous solution. According to these embodiments, the water may comprise at least one contaminant including, but not limited to, viruses, such as enteroviruses, rotaviruses and other reoviruses, adenoviruses Norwalk-type agents, other microbes including fungi, bacteria, flagellates, amoebae, Cryptosporidium, Giardia, and other protozoa. According to certain embodiments, the treated water may display a viral Log reduction value of at least 4 and a bacterial Log reduction value of at least 6. These values may be observed at standard operating temperatures and pH, for example at temperatures range from about 4° C. to 50° C. and at a pH value of at least 5 or more. Embodiments of the methods for treating water may include eluting the water comprising at least one contaminant through the iodinated resin wherein the resin is a part of a water treatment system, such as described herein.

For example, in one embodiment the method for treating water having at least one viral, bacterial or microbial contaminant may comprise eluting water comprising at least one viral, bacterial or microbial contaminant through an iodinated resin prepared by oxidizing iodide ions on a surface of and in the pores of an iodide loaded anion exchange resin with a source of active halogen at a pH value of less than about 7.0 to form the iodinated resin having iodine and iodine intermediate residues on the surface of and in the pores of the iodinated resin. According to specific embodiments, the method for treating water may further comprise changing or regenerating the iodinated resin when at least a portion of the iodinated resin changes from a purple color indicating the presence of iodine and iodine intermediate residues on the surface of and in the pores of the resin to a non-purple color indicating the depletion of iodine. According to various embodiments of the method for treating water, the iodinated resin may have a Log reduction value for viruses of at least 4 and a Log reduction value for bacteria and other microbes of at least 6 over the temperature range of from about 4° C. to 45° C. and at a pH of at least 5.

Figure 7:
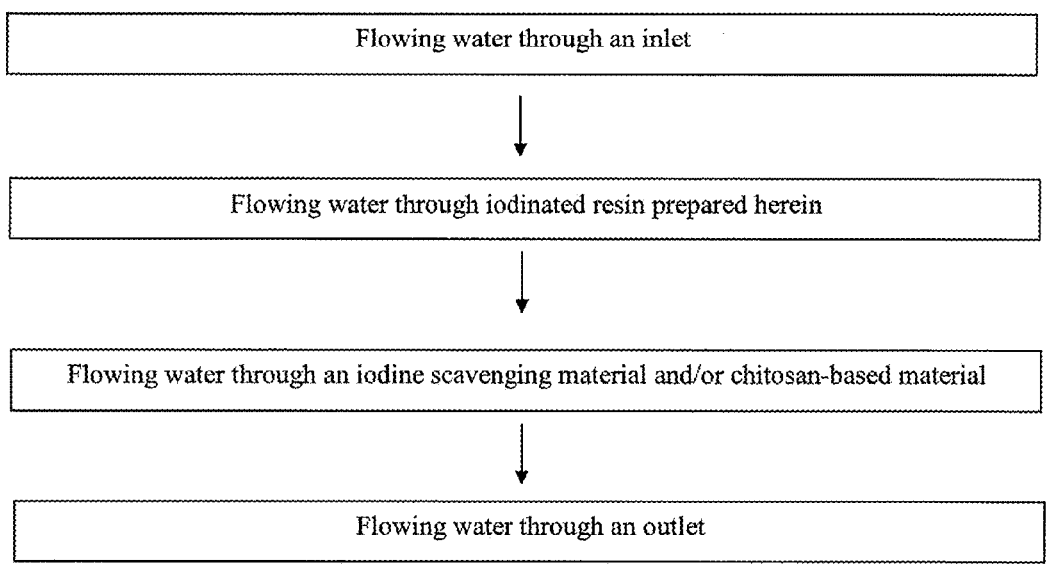
FIG. 7 illustrates a method for treating water with an iodinated anion exchange resin as prepared according to an embodiment herein.

Referring to FIG. 7, in certain embodiments of the method of treating water comprising at least one contaminant by an iodinated resin prepared as described herein may comprise flowing water sequentially through an inlet in fluid communication with an outlet, an iodinated resin prepared according to the methods herein, wherein the iodinated resin is intermediate the inlet and the outlet, at least one halogen scavenger barrier intermediate the iodinated resin and the outlet, wherein the water may have a halide ion concentration of 0 ppm halide ion downstream from the scavenger barrier. The scavenger barrier may comprise at least one scavenger barrier to adsorb or absorb halogens, and/or react with or provide catalytic reaction sites for halogens to convert the halogens to an ionic form. In certain embodiment, the scavenger barrier may be selected from the group consisting of carbon, such as activated carbon, and an ion exchange resin, such as a strong-base anion exchange resin. Activated carbon may comprise any suitable form, such as, for example, carbon pellets, carbon powder, and granular carbon. In various embodiments, the scavenger barrier may comprise granular activated carbon (GAC). In various embodiments, the scavenger barrier may comprise a halogen scavenger barrier, such as, for example, an iodine scavenger resin. In various embodiments, the scavenger barrier may comprise strong-base anion exchange resins, such as, for example, IODOSORB®, available from Water Security Corporation, Sparks, Nev., as described in U.S. Pat. No. 5,624,567. Briefly, IODOSORB®, sometimes referred to as an iodine scavenger resin, comprises trialkyl amine groups each comprising alkyl groups containing 3 to 8 carbon atoms which is capable of removing halogens, including iodine and/or iodide, from aqueous solutions. In various embodiments, the scavenger barrier may comprise a halogen scavenger barrier and GAC, wherein the GAC is intermediate the halogen scavenger barrier and the outlet.

In other embodiments, the method may further comprise flowing the water through a chitosan-based material, wherein the chitosan-based material is intermediate the iodinated resin and the outlet. For example, suitable chitosan and chitosan derivatives are described in U.S. Ser. No. 13/053,939 to Theivendran et al.; Ser. No. 13/069,029 to Theivendran et al.; and 61/595,294 to Theivendran et al. (filed Feb. 6, 2012), the disclosures of each of which are incorporated herein by this reference. The chitosan-based materials may be included, for example, to provide reduced halogen shortage and reduced halide leakage.

According to various embodiment, the present disclosure provides a water treatment system that comprises an iodinated resin prepared or regenerated by a process as described herein. For example, the water treatment system may comprise at least one column or compartment comprising the iodinated resin. According to one embodiment, the iodinated resin may be prepared by a process comprising oxidizing iodide ions on a surface of and in the pores of an iodide loaded anion exchange resin with a source of active halogen at a pH of less than about 7.0 to form the iodinated resin having iodine and iodine intermediate residues on the surface of and in pores of the iodinated resin. The water treatment system may comprise a water inlet, a water outlet and an iodinated resin, prepared by a process described herein, intermediate the water inlet and the water outlet. For example, certain embodiments may include a water treatment system for providing potable water. The water treatment systems may generally comprise a water treatment device comprising at least one iodinated resin prepared according to the methods described herein and a halogen (iodine) scavenger barrier and/or a chitosan-based material as described in U.S. Ser. Nos. 13/053,939; 13/069,029; and/or 61/595,294. According to these embodiments, the iodinated resin may be intermediate the inlet and the outlet and the halogen scavenger barrier and/or chitosan-based material may be located intermediate the iodinated resin and the outlet. In various embodiments, the water treatment system may comprise a point-of-use water treatment system comprising an iodinated resin, a chitosan-based material, a halogen scavenger barrier, and/or granular activated carbon. In various embodiments, the point-of-use water treatment system may comprise a self-contained unit that may be used to treat water from untreated sources and/or a self-contained unit, such as a countertop, refrigerator or other unit, which may be used to treat tap water. Certain embodiments may specifically exclude municipal sewage and/or industrial wastewaters and runoff. In various embodiments, the effluent from a water treatment system may be at least one of free, substantially, and completely free from iodine, iodide, chloride, and/or chlorine. As used herein, the term "substantially free" means that the material is present, if at all, as an incidental impurity. As used herein, the term "completely free" means that the material is not present at all (up to experimental error associated with the measuring protocol).

In addition, the water treatment systems may be capable of removing significantly all of microbial contaminants present in the treated water. For example, eluting water comprising at least one viral or bacterial contaminant through the resin may result in a Log reduction value of viruses of at least 4 and a Log reduction value for bacteria of at least 6, at a temperature range from about 4° C. to 45° C. and a pH of at least 5.

Figure 8A:
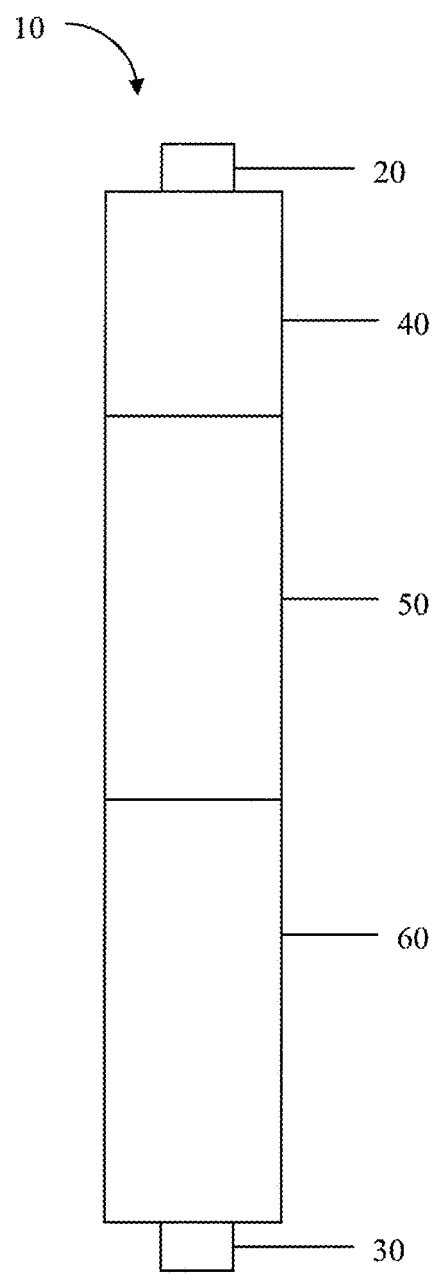

Referring to FIGS. 8A and 8B, in various embodiments, illustrate a water treatment system to provide potable water as described herein. According to these embodiments, the water treatment system comprise water treatment device 10 which may generally comprise an inlet 20 in fluid communication with an outlet 30, an iodinated resin 40, as prepared according to methods herein, intermediate the inlet 20 and the outlet 30, and a chitosan-based material 50 intermediate iodinated resin 40 and the outlet 30; and/or a halogen scavenger barrier 60 intermediate the halogenated chitosan 50 and the outlet 30. Referring to FIG. 8C, in certain embodiments, the water treatment system comprising a water treatment device 10 may generally consist of an inlet 20 in fluid communication with an outlet 30, and an iodinated resin 40 intermediate the inlet 20 and the outlet 30. In various embodiments, chitosan-based material 50 may comprise chitosan or chitin that has been prepared as described in U.S. Ser. No. 13/053,939 to Theivendran et al.; Ser. No. 13/069,029 to Theivendran et al.; and 61/595,294 to Theivendran et al., and the scavenger barrier 60 may comprise an ion exchange resin, such as IODOSORB®, and/or GAC.

In certain embodiments, the water treatment system may comprise a housing (not shown). The housing may comprise a longitudinal axis along the z-axis wherein at least one of the inlet, outlet, iodinated resin, chitosan-based material, and/or scavenger barrier, may be axially aligned along the longitudinal axis. The direction of fluid flow may be from the inlet towards the outlet along the longitudinal axis. The housing may comprise any suitable material, such as, for example, but not limited to, glass, coated metal, ceramic, plastic, and any combination thereof. In at least one embodiment, the housing material may not be permeable to aqueous and/or non-aqueous liquids. The housing may comprise any suitable shape, such as, for example, but not limited to, a polyhedron, a non-polyhedron, and any combination thereof. In at least one embodiment, the housing may comprise a generally cylindrical shape.

Referring to FIG. 9, one embodiment of a method for manufacturing a water treatment system is presented. According to this embodiment, a method of manufacturing a water treatment system comprising an iodinated resin is described. In these embodiments, the method for manufacturing the water treatment system may comprise producing an iodinated resin according to any of the embodiments described herein, and positioning the iodinated resin intermediate an inlet and an outlet, wherein the inlet, the iodinated resin, and the outlet are in fluid communication. In one embodiment, producing the iodinated resin may include treating an iodide loaded anion exchange resin with a source of active halogen, such as active chlorine to form the iodinated resin, wherein the iodine and iodine intermediate residues are formed in situ on the surface of and in the pores of the resin from the iodide residues at the cationic sites on the iodide loaded anion exchange resin. In various embodiments, the water treatment system may comprise at least one chitosan-based material and/or at least one scavenger barrier, and positioning the at least one chitosan-based material and/or the at least one scavenger barrier intermediate the iodinated resin and the outlet. In various embodiments, the water treatment system may comprise GAC intermediate the iodinated resin and the outlet.

In certain embodiments, the fluid contacting the iodinated resin may have a fluid velocity less than 0.5 cm/s. In at least one embodiment, the fluid velocity may be between 0.3 cm/s and 0.5 cm/s. In at least one embodiment, the fluid velocity may be less than 0.3 cm/s. In at least one embodiment, the fluid velocity may be between 0.15 cm/s and 0.24 cm/s. In at least one embodiment, the fluid velocity may be less than 0.15 cm/s. In at least one embodiment, the fluid velocity may be greater than 0.5 cm/s.

These and other features of the various embodiments of the present disclosure will become more apparent upon consideration of the following examples. The various embodiments of this disclosure described in the following examples are not to be considered as limiting the invention to their details.

EXAMPLES

As generally used herein, the terms "ND" refers to not detectable or below the detection limit and "NA" refers to not applicable For the present examples, chemicals were obtained from the following sources, although other sources are possible. The strong base anion exchange resin (DOWEX™ SBR C Anion Exchange Resin, CAS #069011-19-4)) was obtained from The Dow Chemical Company, Midland, Mich. Potassium iodide was obtained as a 45% (wt %) aqueous solution (CAS #7681-11-0) from Deep Water Chemicals, Subsidiary of Tomen America Inc., Woodward, Okla. and diluted as required. Trichloroisocyanuric acid (TCCA, CAS #87-90-1) was obtained from Acros Organics, Fair Lawn, N.J., having 99% trichloroisocyanuric acid, a molecular weight of 232.41 g, and a solubility in water of 12 g/L. Iodine crystals USP (CAS #7553-56-2) were obtained from Deep Water Chemicals, Subsidiary of Tomen America Inc., Woodward, Okla.

Example 1

Production of Iodinated Resin

Preparation of Iodinated Resin Using In Situ Formed Iodine on Resin Surface and Pores In this Example, an iodinated was prepared according to one embodiment of the present disclosure and comparative MCV® resin and resin according to U.S. application Ser. No. 13/466,801 ('801 Resin) were prepared according to the prior art procedures. The different procedures for preparation of the iodinated resin and conventional iodinated anion exchange resins are presented in Table 1.

TABLE 1

Comparison of Procedures of Production

| MCV ® Resin | '801 Resin | Present Resin (N70) |
|---|---|---|
| Step 1: Chloride stripping using Iodide solution | Step 1: Chloride stripping using Iodide solution | Step 1: Chloride stripping using Iodide solution |
| Step 2: None | Step 2: None | Step 2: Unique in situ oxidation reaction using chlorine source (e.g. TCCA) at lower pH range (<7.0 preferred 4.0) |
| Step 3-6: Iodine loading requiring lengthy multi-step dissolution of Iodine crystals (100%: For 5 cu. ft. 80 Kg $I_2$) Longer processing time: 16 h | Step 3: Iodine loading using ex situ reaction of Iodide and Chlorine source (80%: For 5 cu. ft. 64 Kg $I_2$) Processing time: 1 h | Step 3: Iodine loading (one step) using Iodine crystals (33.3%: For 5 cu. ft. 26.6 Kg $I_2$) Processing time: 12 h | a) Comparative Example—Preparation of MCV® Resin Using Iodine Crystal

Iodide loading—DOWEX™ SBR C anion exchange resin (100 cc) was placed in a 1 L glass bottle and treated with an aqueous solution of iodide to remove chloride ions. A 1% (wt %) aqueous solution of KI (127.1 mL) was added to the bottle and the mixture agitated by tumbling for 1 hr and the supernatant removed. Next, a 7% (wt %) aqueous solution of KI (127.1 mL) was added to the bottle and the mixture agitated by tumbling for 1 hr and the supernatant removed. Next, a 16% (wt %) aqueous solution of KI (127.1 mL) was added to the bottle and the mixture agitated by tumbling for 1 hr and the supernatant removed. Next, a 10% (wt %) aqueous solution of KI (127.1 mL) was added to the bottle and the mixture agitated by tumbling for 1 hr, the resin-liquor was allowed to equilibrate and the supernatant was not removed. This slurry was submitted directly to the iodination step.

Iodination with $I_2$ Crystals—To the slurry from the iodide loading process was added iodine crystals ($I_2$(s), 35.31 g) and the mixture tumbled for 30 min. Next an additional 21.19 g of $I_2$(s) was added to the slurry and the mixture was tumbled for 15 min/hr over 16 hr. The supernatant was removed and the resulting iodinated resin was washed three times using 1 L of deionized (DI) water each time. The process uses a total iodine of about 80 Kg for 5 cu. ft of resin, or about 66.6% more iodine by weight that the loading process for the iodinated resins detailed herein. The small column test for iodine reading after 30 minutes of the iodination process was 3.5 to 4.5 ppm. The total process time, including iodide loading and iodination is approximately 20 hr, or about four-time longer than the in situ loading process described herein.

b) Comparative Example—Preparation of '801 Resin Using Ex Situ Iodine Formation

Iodide loading—DOWEX™ SBR C anion exchange resin (100 cc) was placed in a 1 L glass bottle and treated with iodide to remove chloride ions using the same process used in Example 1, part (a), except after the tumbling step in the fourth iodide loading step, the supernatant was removed.

Iodination by ex situ Iodine Formation—To the iodide loaded DOWEX™ SBR C resin in the 1 L glass bottle was added 100 mL of a 20% (wt %) aqueous solution of KI. TCCA solid (7 g) was slowly added and the mixture agitated by tumbling for 20 min and the supernatant removed. This process was repeated by adding 100 mL of 20% (wt %) KI (aq) followed by gently adding 7 g of TCCA, tumbling for 20 min and removal of the supernatant. The process was repeated a third time by adding 100 mL of 20% (wt %) KI (aq) followed by gently adding 7 g of TCCA, tumbling for 20 min and removal of the supernatant. The resulting iodinated anion exchange resin was washed three times using 1 L of deionized (DI) water each time. The process uses a total iodine of about 64 Kg for 5 cu. ft of resin, or about 46.7% more iodine by weight that the loading process for the iodinated resins detailed herein. The iodine reading after 30 minutes of the iodination process was 1.0 to 2.5 ppm. The total process time, including iodide loading and iodination is approximately 5 hr.

c) Preparation of Iodinated Resin According to the Present Disclosure

Iodide loading—DOWEX™ SBR C anion exchange resin (100 cc) was placed in a 1 L glass bottle and treated with iodide to remove chloride ions using the same process used in Example 1, part (a).

Reaction with Active Halogen—The resin-liquor was allowed to equilibrate and the supernatant was not removed. The slurry was submitted directly to the chlorination step. The chlorination step included gently adding 8 g of TCCA (granular) to the resin and tumbling for 4 hrs. The pH of the reaction mixture was about 4.0. The iodinated resin was then reacted with iodine crystals to convert at least a portion of the residual $I^-$ anionic residues to $I_3^-$ residues.

Iodination with $I_2$ Crystals—To the slurry from the chlorination process as added iodine crystals ($I_2$(s), 18.8 g) and the mixture was tumbled for 30 min. The slurry/mixture was tumbled for over 12 hours. The supernatant was removed and the resulting iodinated resin was washed three times using 1 L of deionized (DI) water. The process used a total iodine weight of about 26.6 Kg for 5 cu. ft of resin or about 33.3% of the amount of iodine used in loading iodinated anion exchange resins according to conventional methods. A small column of the iodinated resin was tested for iodine reading after a 30 minute aging process with dechlorinated tap water and the result showed 1.0 to 2.5 ppm of iodine. The total processing time, including iodide loading of the anion exchange resin, reaction with active halogen (TCCA), and iodination with $I_2$(s) was approximately 20 hr. Reduction of the processing time may be possible using powder TCCA.

d) Comparison of Resin Manufacturing Parameters

The manufacturing parameters of an iodinated resin prepared according to the present disclosure was compared to those for the preparation of conventional iodinated anion exchange resins. Table 2 provides a comparison of the characteristics of an iodinated resin of the present disclosure (Example 1c) to those of MCV® (Example 1a) and the '801 resin (Example 1b).

TABLE 2

Comparison of Iodinated Resin with Conventional Iodinated Anion Exchange Resins

| Parameters | MCV ® | '801 Resin | Iodinated Resin |
|---|---|---|---|
| Iodine ($I_2$) required for loading (Kg/5 cu. ft.) | 80 | 64 | 26.6 |
| Approximate % of Iodine ($I_2$) elution - during operation | 30% (26.6 Kg) | 30% (may be higher when end of capacity increases) (>26.6 Kg) | 100% (26.6 Kg) |
| Approximate residual Iodine species remaining on the resin at end of lifetime | 70% | 50% | 0% |
| Microbial Pathogen removal efficacy | 100% | 100% | 100% |
| IODOSORB ® scavenger resin requirement (Comparison) | 100% | 100% | 100% |

As can be seen in Table 2, the iodinated resins of the present disclosure utilize less iodine for loading the resin compared to conventional iodinated anion exchange resins. For example, the iodinated resin uses only 33.3% by weight iodine compared to MCV® iodinated anion exchange resin and only 41.6% by weight iodine compared to the '801 iodinated anion exchange resin. Further, the iodinated resins are more efficient in iodine use (elution) during operation over the lifetime of the resin. For example, for the iodinated resin, approximately 100% by weight of the loaded iodine is eluted and utilized for water purification/pathogen kill compared to approximately 30% by weight for conventional iodinated anion exchange resins. This provides evidence for a different, non-ion exchange-based mechanism for iodine release from the resin. Further, at the end of the useful lifetime of the resin, the iodinated resin is essentially completely depleted of iodine (~0% by weight iodine remaining) compared to the MCV® iodinated anion exchange resin that has up to 70% by weight of iodine remaining and the '801 iodinated anion exchange resin that has approximately 50% by weight of iodine remaining and the end of life. Because of the remaining iodine on the iodinated anion exchange resin, these resins do not display a visually determined end-of-life indication by depletion of the iodine related purple color. The iodinated resin and the conventional iodinated anion exchange resins display essentially 100% microbial pathogen removal efficacy and all resins require a downstream iodine scavenger, such as IODOSORB® or other halogen scavenger.

TABLE 3

Elemental Iodine Analysis for Iodinated resin and Conventional Iodinated Anion Exchange Resins

| Sample | Method | % of I: Iodine |
|---|---|---|
| MCV ® | GLI Procedure E35-2 | 67.63 |
| '801 Resin | GLI Procedure E35-2 | 44.02 |
| Iodinated Resin | GLI Procedure E35-2 | 45.06 |

Table 3 displays analysis of percent of elemental iodine on an iodinated resin prepared in Example 1c compared to conventional iodinated anion exchange resins, MCV® (Example 1a) and the '801 resin (Example 1b). The analysis was performed by Galbraith Laboratory using GLI Procedure E35-2. The % iodine value for the iodinated resin according to the present disclosure includes iodine and iodine intermediate residues on the surface of and in the pores of the resin bead and $I_3^-$ residues on the ionic sites of the resin.

Additional benefits observed with the iodinated resins of the present disclosure include: a) no out-gassing of volatile iodine during extended storage; b) iodine raw material cost savings due to less iodine being required to load the iodinated resin; and c) lower weight of the final iodinated resin, compared to the iodinated anion exchange resin, due to less iodine loading ($I_2$ molecular weight=253.8 g/mol) on the iodinated resin, which results in savings in transportation costs.

Example 2

Iodine and Total Iodine Elution Comparison

The iodine and total iodide (TI) elution of iodinated resin prepared according to Example 1c was compared with commercially available MCV® iodinated anion exchange resin (MCV Manufacturing, Inc., Sparks Nev., Example 1a) and the '801 anion exchange resin (Example 1b). Iodine elution and TI elution for the iodinated resin and two conventional iodinated anion exchange resin were analyzed at room temperature (23° C.). The iodine ($I_2$) concentration was measured by the leuco-crystal violet method 4500-I B and the iodide ($I^-$) concentration was measured by the leuco-crystal violet method 4500-$I^-$ B as described in "Standard Methods for the Examination of Water and Wastewater," American Water Works Association, $21^{st}$ edition (2005), pp. 4-95 and 4-98. Iodine Elution for 15 cc of Resin at 23° C.

Iodine elution and total iodine was measured for 15 cc of iodinated resin prepared according to Example 1c and for 15 cc each of conventional iodinated anion exchange resins, MCV® iodinated anion exchange resin and the '801 iodinated anion exchange resin. Dechlorinated tap water was eluted through each resin at a flow rate of 160 mL/min and empty bed contact time (EBCT) of 5.6 sec. and a temperature of 23° C. The resulting concentration values for iodine ($I_2$) elution (in ppm) for the resins is presented in FIG. 1 and the concentration values for TI elution (in ppm) are presented in FIG. 2. Commercially available MCV® resin displayed increased $I_2$ and TI elution over the first 1000 L of feed volume. After about 1500 L of feed volume the iodinated resin and the iodinated anion exchange resins displayed similar iodine elution through 3000 L, while TI elution values became similar after about 1000 L of feed volume. Iodine elution for the iodinated resin ranged between about 0.8 ppm to about 1.7 ppm over the entire elution volume (see FIG. 1), whereas TI elution for the iodinated resin ranged between about 1.8 ppm to about 2.5 ppm over the entire elution volume (see FIG. 2). It is speculated that the total iodine value observed for the iodinated resins of the present disclosure includes iodine and iodine intermediates on the surface of and in the pores of the resin, and small amounts of residual iodide, as based on the method of preparation.

Example 3

Iodine and Total Iodine Elution at Elevated Temperature

Many areas where water contamination is a problem are located in tropical and subtropical environments where atmospheric temperatures may range from the mid 30°'s to the 40°'s (Celsius). For a successful water treatment system, it is desired that iodine elution levels from the iodinated resin are not affected by increased temperatures. In this example, the iodine elution of an iodinated resin prepared according to the present disclosure, commercially available MCV® iodinated anion exchange resin, and the '801 anion exchange resin were compared at elevated temperatures (40° C.).

Iodine elution and total iodine was measured for 15 cc of iodinated resin prepared according to Example 1c and for 15 cc of conventional iodinated anion exchange resins, MCV® iodinated anion exchange resin and the '801 iodinated anion exchange resin. Dechlorinated tap water was eluted through each resin at a flow rate of 160 mL/min and empty bed contact time (EBCT) of 5.6 sec. and a temperature of 40° C. The resulting concentration values for iodine ($I_2$) elution (in ppm) for the resins is presented in FIG. 3 and the concentration values for TI elution (in ppm) are presented in FIG. 4. Commercially available MCV® resin and the '801 iodinated anion exchange resin displayed increased $I_2$ and TI elution over the first 500 L of feed volume. After about 500-1000 L of feed volume the iodinated resin and the iodinated anion exchange resins displayed similar iodine elution through 3000 L, while TI elution values became similar after about 1000 L of feed volume. Iodide elution for the iodinated resin ranged between about 0.8 ppm to about 1.7 ppm over the entire elution volume (see FIG. 3), whereas TI elution for the iodinated resin ranged between about 1.0 ppm to about 3.1 ppm over the entire elution volume (see FIG. 4).

Figure 6:
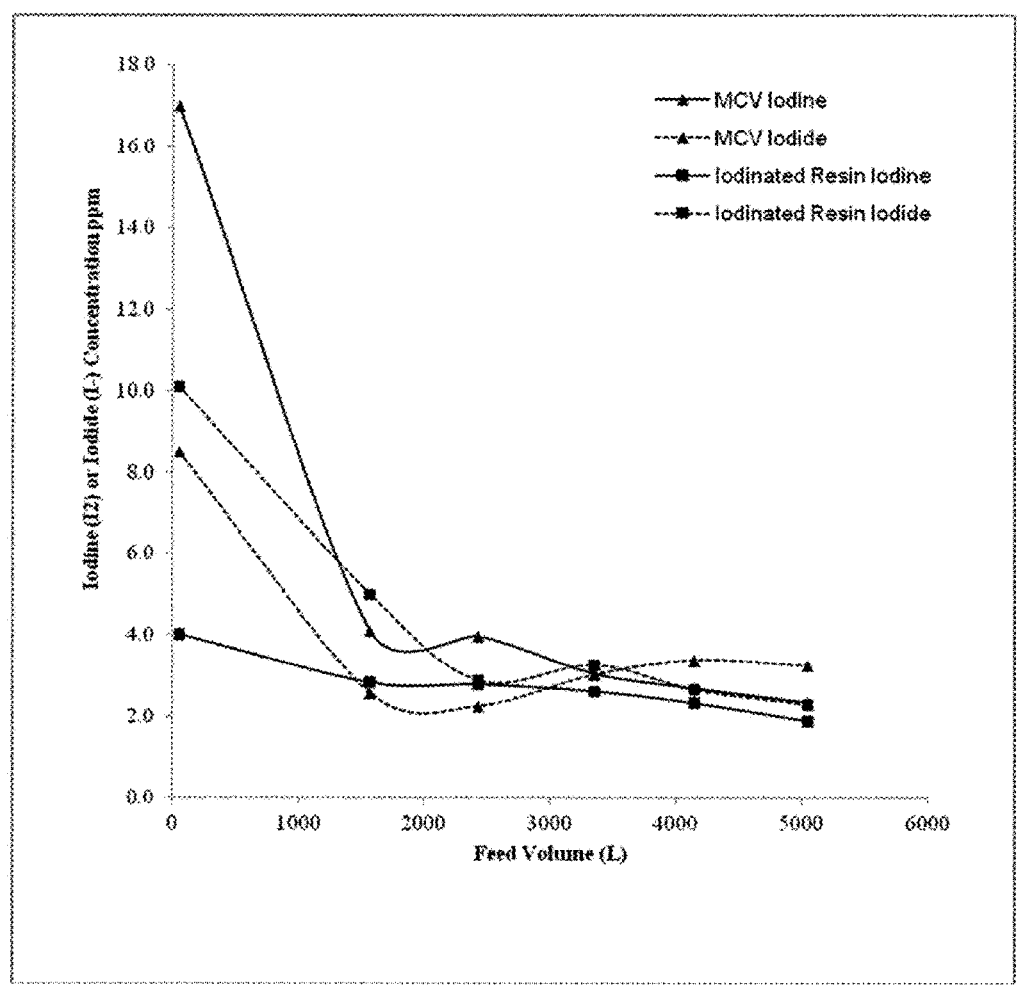
FIG. 6 illustrates iodine/iodide elution profiles of iodinated resins according to the present disclosure and elution profiles of MCV® iodinated anion exchange resin.

In a second study, the iodine and iodide ion ($I^-$) elution of an iodinated resin prepared herein was compared to that of commercially available MCV® iodinated anion exchange resin at 41° C. during extended operational conditions. In this experiment, 68 cc of iodinated resin was compared to 68 cc of MCV® resin. De-chlorinated tap water was eluted through each resin at a flow rate of 600 mL/min and empty bed contact time (EBCT) of 6.8 and a temperature of 41° C. The resulting concentration values for iodine ($I_2$) elution and iodide elution (in ppm) for the resins is presented in FIG. 6. Initial iodine elution values during startup were greater for conventional MCV® resin compared to iodinated resin of the present disclosure. Both the iodinated resin and MCV® resin elutes similar amounts of iodine at around 5000 L feed volume, having values of 1.9 and 2.3, respectively. Iodide elution values for the iodinated resin and the MCV® were similar over the entire feed volume. Table 4 provides iodine and iodide elution values for both resins over the feed volume.

TABLE 4

Iodine ($I_2$) and Iodide ($I^-$) Elution from MCV ® and Iodinated Resin at 41° C.

|  | 68 CC MCV ® | | 68 CC Iodinated resin | |
| --- | --- | --- | --- | --- |
| Feed Volume (L) 5040 | Iodine ppm | Iodide ppm | Iodine ppm | Iodide ppm |
| 54 | 17.0 | 8.5 | 4.0 | 10.1 |
| 738 | 7.1 | 1.5 | 3.3 | 3.7 |
| 1566 | 4.1 | 2.6 | 2.8 | 5.0 |
| 2430 | 4.0 | 2.3 | 2.8 | 2.9 |
| 3348 | 3.0 | 3.0 | 2.6 | 3.3 |
| 4140 | 2.7 | 3.4 | 2.3 | 2.7 |
| 5040 | 2.3 | 3.2 | 1.9 | 2.3 |

Example 4

A challenge experiment may be used to determine the ability of a water treatment system to reduce pathogenic contaminants from a fluid. A challenge, or a known quantity of a selected microbiological contaminant, is added to the influent. The virus MS2 coliphage (ATCC 15597-B1) was chosen as the microbiological contaminant. The amount of the contaminant in the influent and effluent may be measured to determine the filtration capacity or microbial inactivation capacity of the water treatment system comprising an iodinated resin prepared according to the methods described herein, compared to conventional iodinated anion exchange resin. The iodinated resin prepared as described herein displays comparable removal values as conventional iodinated anion exchange resins.

A challenge experiment of certain embodiments of the water treatment systems including an iodinated resin prepared in Example 1c was compared to conventional water treatment systems comprising an MCV® iodinated anion exchange resin (Example 1a) and the '801 iodinated anion exchange resin (Example 1b). A Log reduction value (Log PFU/mL) of approximately 5 Log PFU/mL for MS2 in 3000 mL de-chlorinated tap water at room temperature was introduced to the water treatment system via the inlet and dispensed through the outlet. The influent and effluent were tested for MS2 coliphage before and after contact with the water treatment systems. Each of the resins (15 cc) were aged at 40° C. and 160 mL/min flow rate and then challenged with the MS2 water system at room temperature (23° C.). The feed water flow rate remained at 160 mL/min with a total feed volume of water of 3300 L.

The results of a challenge experiment of a water treatment system comprising iodinated resins prepared in Example 1(c); MCV® iodinated anion exchange resin; and the '801 iodinated anion exchange resin are shown in Table 5 for resin aged at 40° C. and then challenged at room temperature. The MS2 removal by the iodinated resins of the present disclosure, the MCV® iodinated anion exchange resin and the '801 iodinated anion exchange resin were similar with 0.7-0.8 Log PFU/mL removal at 3000 L feed water passage.

TABLE 5

Room Temperature MS2 Removal Iodinated Resin (aged at 40° C.)

| | MS2 Population (Log PFU/ml) | | |
| --- | --- | --- | --- |
| Feed Volume (L) | Influent | Effluent | Log removal |
| 235 | | | |
| MCV ® | 4.7 | 2.1 | 2.6 |
| '801 Resin | 4.7 | 1.2 | 3.5 |
| Present Iodinated Resin | 4.7 | 0.8 | 3.9 |
| 1143 | | | |
| MCV ® | 5.6 | 4.8 | 0.8 |
| '801 Resin | 5.6 | 4.5 | 1.0 |
| Present Iodinated Resin | 5.6 | 4.6 | 1.0 |
| 1628 | | | |
| MCV ® | 5.5 | 4.9 | 0.6 |
| '801 Resin | 5.5 | 4.4 | 1.1 |
| N70 | 5.5 | 4.7 | 0.8 |
| 2549 | | | |
| MCV ® | 5.5 | 4.9 | 0.7 |
| '801 Resin | 5.5 | 4.7 | 0.8 |
| Present Iodinated Resin | 5.5 | 4.4 | 1.1 |
| 3235 | | | |
| MCV ® | 5.8 | 5.0 | 0.8 |
| '801 Resin | 5.8 | 5.1 | 0.7 |
| Present Iodinated Resin | 5.8 | 5.1 | 0.7 |

Example 5

A second challenge experiment was performed to determine the ability of a water treatment system comprising the iodinated resins described herein to reduce pathogenic contaminants from a fluid when the resin has been aged at high temperature and challenged at pH 5, and low temperature (4° C.) conditions. The iodinated resin and conventional MCV® iodinated anion exchange resin were aged at 36° C. and challenged at 4° C. and a pH of 5. This example demonstrates that the iodinated resins prepared herein shows acceptable pathogenic removal values even after sitting at high temperatures, such as those associated with tropical or sub-tropical locales. The virus MS2 coliphage (ATCC 15597-B1) was chosen as the microbiological contaminant.

A challenge experiment of certain embodiments of the water treatment systems including an iodinated resin prepared in Example 1(c) was compared to conventional water treatment systems comprising an MCV® iodinated anion exchange resin. A Log value (Log PFU/mL) of 5 for MS2 in 1000 mL de-chlorinated tap water at pH 5 and low temperature (4° C.) conditions was introduced to the water treatment system via the inlet and dispensed through the outlet. The influent and effluent were tested for MS2 coliphage before and after contact with the water treatment systems. The resins (15 cc) were aged at 36° C. and 160 mL/min flow rate up to 1400 L and then challenged with the MS2 in dechlorinated tap water at pH 5 and low temperature (4° C.) conditions. The feed water flow rate remained at 160 mL/min.

The results of a challenge experiment of a water treatment system comprising iodinated resins prepared in Example 1c and conventional MCV® iodinated anion exchange resin are shown in Table 6. The MS2 removal by MCV® iodinated anion exchange resin and the present iodinated resin were 0.5 and 1.1 Log PFU/mL of removal, respectively, at 1400 L. The iodinated resin of the present disclosure performed better compared to conventional MCV® resin on MS2 removal at pH 5 and low temperature conditions.

TABLE 6

MS2 Removal Iodinated Resin at 1400
L feed volume (aged at 38° C.)

| Feed volume 1400 L | Treatment MS2 Log removal (Log PFU/mL) | | |
|---|---|---|---|
| | Influent | Effluent | Removal |
| MCV ® | 5.6 | 5.1 | 0.5 |
| Ex 1(c) Iodinated resin | 5.6 | 4.5 | 1.1 |

Example 6

Out Gassing

Commercially available iodinated resins may display iodine evaporation during extended storage. Out gassing of iodine was observed when commercially available MCV® iodinated anion exchange resin is stored at elevated temperature (50° C.) conditions as observed by the packaging materials turning a yellowish brown color due to iodine evaporation into the packaged atmosphere. Under similar conditions, iodinated resin prepared using the processes described herein displays no change in the color of the packaging materials after storage at elevated temperature conditions after 20 days.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments of water treatment systems have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

We claim:

1. A method for producing an iodinated resin, comprising:
converting iodide ions on a surface of and in pores of an iodide loaded anion exchange resin to iodine and iodine intermediate residues by oxidizing the iodide ions on a surface of and in pores of the iodide loaded anion exchange resin with a source of active chlorine or active bromine at a pH of less than about 7.0 to form an iodinated resin having iodine and iodine intermediate residues on the surface of and in pores of the resin.

2. The method of claim 1, further comprising loading additional iodine ($I_2$) onto the iodinated resin using a source of soluble iodine.

3. The method of claim 1, wherein the source of active chlorine or active bromine produces in situ at least one of chlorine ($Cl_2$) and bromine ($Br_2$).

4. The method of claim 1, wherein the source of active halogen is a source of active chlorine selected from the group consisting of chlorine gas, trichloroisocyanuric acid (TCCA), sodium dichloroisocyanuriate, sodium hypochlorite, calcium hypochlorite, hypochlorous acid, and combinations of any thereof.

5. The method of claim 4, wherein the source of active chlorine is trichloroisocyanuric acid at a pH of less than 7.0.

6. The method of claim 1, further comprising treating a chloride form anion exchange resin with an aqueous solution of a soluble iodide salt to form the iodide loaded anion exchange resin.

7. The method of claim 6, wherein the aqueous solution of the soluble iodide salt is an aqueous solution of KI, NaI, or mixtures thereof.

8. The method of claim 6, wherein the chloride form anion exchange resin comprises a plurality of quaternary ammonium cationic sites.

9. The method of claim 2, wherein the source of soluble iodine is selected from iodine crystals dissolved in aqueous solution, iodine formed in the aqueous solution ex situ by reacting solubilized iodide ions with a source of active halogen, and combinations thereof.

10. The method of claim 9, wherein the source of soluble iodine is iodine formed ex situ in the aqueous solution by reacting solubilized iodide ions with a source of active halogen.

11. The method of claim 10, wherein the source of active halogen is a source of active chlorine selected from the group consisting of chlorine gas, trichloroisocyanuric acid (TCCA), sodium dichloroisocyanuriate, sodium hypochlorite, calcium hypochlorite, hypochlorous acid, and combinations of any thereof.

12. The method of claim 1, further comprising regenerating the iodinated resin after use by submitting the used iodinated resin to a process comprising:
  treating the used resin to an aqueous solution of solubilized iodide ion to form a regenerated iodide loaded resin; and
  converting iodide on a surface of and in pores of the regenerated iodide loaded resin to iodine and iodine intermediate residues to form a regenerated iodinated resin.

13. The method of claim 12, wherein at least a portion of the used iodinated resin is a non-purple color indicating the depletion of iodine and iodine intermediate residues on the resin and wherein the regenerated iodinated resin is a purple color indicating the presence of iodine and iodine intermediate residues on the surface of and in the pores of the regenerated iodinated resin.

14. A method for producing an iodinated resin comprising:
  treating a chloride form anion exchange resin with an aqueous solution of a soluble iodide salt to form an iodide loaded anion exchange resin;
  oxidizing the iodide ions on a surface of and in pores of the iodide loaded anion exchange resin with a source of active chlorine at a pH of less than about 7.0 to form an iodinated resin having iodine and iodine intermediate residues on the surface of and in pores of the iodinated resin; and
  loading the iodinated resin further with iodine using a source of soluble $I_2$.

15. The method of claim 14, wherein oxidizing the iodide ions on the surface of and in the pores of the iodide loaded anion exchange resin comprises treating the iodide ions with a solution of trichloroisocyanuric acid at a pH less than about 7.0 to form iodine and iodine intermediate residues on the surface of and in the pores of the iodinated resin.

16. The method of claim 14, wherein the method utilizes 40% by weight of an amount of iodine compared to conventional methods for preparing iodinated anion exchange resins.

17. An iodinated resin produced by a process according to claim 1, wherein the iodinated resin comprises iodine residues and iodine intermediate residues on the surface of and in the pores of the iodinated resin and wherein the iodinated resin displays a Log reduction value for viruses of at least 4 and a Log reduction value for bacteria of at least 6 at a temperature range from about 4° C. to up to 45° C.

18. The iodinated resin of claim 17, wherein the iodinated resin further acts as an end of life indicator where the color of at least a portion of the iodinated resin changes from a purple color indicating the presence of iodine and iodine intermediate residues to a non-purple color indicating the depletion of iodine and iodine intermediate residues as iodine is eluted from the iodinated resin.

19. A method for treating water comprising:
  eluting water comprising at least one viral, bacterial, or microbial contaminant through an iodinated resin prepared by the method of claim 1.

20. The method of claim 19, further comprising changing or regenerating the iodinated resin when at least a portion of the iodinated resin changes from a purple color indicating the presence of iodine and iodine intermediate residues to a non-purple color indicating the depletion of iodine and iodine intermediate residues.

21. The method of claim 19, wherein the iodinated resin has a Log reduction value for viruses of at least 4 and a Log reduction value for bacteria of at least 6 at a temperature range from about 4° C. to up to 45° C. and a pH of at least 5.

22. A water treatment system comprising:
  at least one column or compartment comprising an iodinated resin and configured to elute water through the at least one column or compartment, wherein the iodinated resin is prepared by the method of claim 1.

23. The water treatment system of claim 22, wherein the iodinated resin has a Log reduction value for viruses of at least 4 and a Log reduction value for bacteria of at least 6 at a temperature range from about 4° C. to up to 45° C. and a pH of at least 5.

* * * * *